US008682552B2

(12) United States Patent
Tsutsui et al.

(10) Patent No.: US 8,682,552 B2
(45) Date of Patent: Mar. 25, 2014

(54) CONTROL APPARATUS OF AUTOMATIC TRANSMISSION

(75) Inventors: Hiroshi Tsutsui, Nishio (JP); Yutaka Teraoka, Anjo (JP); Masatake Ichikawa, Kariya (JP); Shoji Omitsu, Toyota (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 524 days.

(21) Appl. No.: 13/023,593

(22) Filed: Feb. 9, 2011

(65) Prior Publication Data

US 2011/0246036 A1    Oct. 6, 2011

(30) Foreign Application Priority Data

Mar. 31, 2010 (JP) ................................. 2010-082527

(51) Int. Cl.
*B60W 10/02* (2006.01)
*F16D 48/06* (2006.01)

(52) U.S. Cl.
USPC ............................................. 701/67; 701/54

(58) Field of Classification Search
USPC ............ 701/51, 53, 54, 55, 56, 64, 66, 67, 99
See application file for complete search history.

(56) References Cited

U.S. PATENT DOCUMENTS

| 6,652,415 | B2 * | 11/2003 | Segawa et al. .................. 477/62 |
| 6,991,078 | B2 * | 1/2006 | Leber ........................... 192/3.27 |
| 2004/0157705 | A1 * | 8/2004 | Nobumoto et al. ............ 477/174 |
| 2004/0229728 | A1 * | 11/2004 | Oshima et al. ................. 477/176 |
| 2006/0212204 | A1 * | 9/2006 | Honma et al. ................... 701/67 |
| 2006/0237275 | A1 * | 10/2006 | Fujita et al. .................. 192/3.29 |

(Continued)

FOREIGN PATENT DOCUMENTS

| JP | 2003-343718 A | 12/2003 |
| JP | 2004-263733 A | 9/2004 |

(Continued)

OTHER PUBLICATIONS

International Search Report for corresponding International Patent Application No. PCT/JP2011/053116 mailed Apr. 19, 2011.

*Primary Examiner* — Jason Holloway
(74) *Attorney, Agent, or Firm* — Sughrue Mion, PLLC

(57) ABSTRACT

A control apparatus of an automatic transmission having an automatic speed change mechanism for changing a driving source speed of rotation and a clutch engaged at a start, a fluid transmission apparatus between the driving source and the automatic speed change mechanism, and a lock-up clutch for locking up the fluid transmission apparatus. The control apparatus includes a range unit that determines a shift range including a drive range, a vehicle stop unit that determines a stop of a vehicle, a start intended operation unit that detects an intended start vehicle operation, a clutch control unit that controls the clutch to be disengaged to place the automatic speed change mechanism in a neutral state while the shift range is determined to be the drive range and the vehicle is determined to be stopped, and performs engagement control of the clutch to control the start of the vehicle when the operation intended for starting the vehicle is detected, and a lock-up clutch control unit that controls the lock-up clutch to be engaged while the shift range is determined to be the drive range and the vehicle is determined to be stopped, and controls the lock-up clutch so that the lock-up clutch is at least engaged in a slip region in which a predetermined torque capacity is obtained, when the operation intended for starting the vehicle is detected.

3 Claims, 17 Drawing Sheets

(56) References Cited

U.S. PATENT DOCUMENTS

2008/0125287 A1* 5/2008 Kakiuchi et al. .............. 477/114
2008/0172161 A1* 7/2008 Kondo et al. ................... 701/66
2009/0247363 A1* 10/2009 Nagami et al. ................ 477/181

FOREIGN PATENT DOCUMENTS

| JP | 2005-003193 A | 1/2005 |
| JP | 2005-016563 A | 1/2005 |
| JP | 2008-116005 A | 5/2008 |

* cited by examiner

FIG.3

|   | C-1 | C-2 | C-3 | B-1 | B-2 | F-1 |
|---|---|---|---|---|---|---|
| P |   |   |   |   |   |   |
| REV |   |   | ○ |   | ○ |   |
| N |   |   |   |   |   |   |
| 1ST | ○ |   |   |   | (○) | ○ |
| 2ND | ○ |   |   | ○ |   |   |
| 3RD | ○ |   | ○ |   |   |   |
| 4TH | ○ | ○ |   |   |   |   |
| 5TH |   | ○ | ○ |   |   |   |
| 6TH |   | ○ |   | ○ |   |   |

* (○): ENGINE BRAKE IN OPERATION

CONTROL APPARATUS OF AUTOMATIC TRANSMISSION

INCORPORATION BY REFERENCE

The disclosure of Japanese Patent Application No. 2010-082527 filed on Mar. 31, 2010 including the specification, drawings and abstract is incorporated herein by reference in its entirety.

BACKGROUND OF THE INVENTION

The present invention relates to a control apparatus of an automatic transmission mounted, for example, in a vehicle, and specifically to a control apparatus of an automatic transmission that starts a vehicle while controlling a clutch of an automatic speed change mechanism and a lock-up clutch.

DESCRIPTION OF THE RELATED ART

In recent years, a majority of automatic transmissions mounted in vehicles and so on are provided with a torque converter between an engine and an automatic speed change mechanism, and the torque converter is provided with a lock-up clutch. The lock-up clutch is generally locked when a vehicle speed has increased to a predetermined speed or more, thereby reducing a fluid transmission loss of the fluid transmission apparatus. However, because the lock-up clutch has been released when the vehicle starts, the vehicle is started while the torque converter slips, thus revving up the engine. There is a problem that the revving up of the engine at the vehicle start prevents improvement in fuel consumption of the vehicle.

Therefore, in order to prevent the revving up of the engine at the vehicle start, it is proposed to perform so-called flexible start control in which the lock-up clutch is slip-controlled from the start (refer to Japanese Patent Application Publication No. JP-A-2005-16563).

SUMMARY OF THE INVENTION

However, although the flexible start control is required to start the slip control of the lock-up clutch immediately after the start of the vehicle, in reality, it is difficult to place the lock-up clutch promptly in the slip state due to a delay in hydraulic pressure response and a delay in actuation response of a lock-up piston even though the slip control of the lock-up clutch is commanded immediately after the start. During that time, the engine may rev up, thus causing the problem that the fuel consumption of the vehicle cannot be improved.

In addition, because the amount of discharge of oil from an oil pump coupled with the engine is small while the engine speed is low, it is difficult to stabilize an operating oil pressure of the lock-up clutch in accordance with a command value, under the influence of change in operating oil pressure supplied to hydraulic servos of clutches and brakes in the automatic speed change mechanism. Therefore, there has also been a problem that the slip control cannot be performed in a stable manner, and thus a transfer torque capacity of the lock-up clutch becomes unstable, whereby shake-back shock tends to occur.

Thus, it is an object of the present invention to provide a control apparatus of an automatic transmission that enables a vehicle to start while preventing an occurrence of revving up of a driving source and a shake-back shock, and is thereby capable of improving fuel consumption and ride comfort of the vehicle.

According to a first aspect of the present invention, a clutch control unit controls a clutch to be disengaged to place an automatic speed change mechanism in a neutral state while a shift range is determined to be a drive range and a vehicle is determined to be stopped, and performs engagement control of the clutch to control a start of the vehicle when an operation intended for starting the vehicle is detected. On the other hand, a lock-up clutch control unit controls a lock-up clutch to be engaged in the state in which the shift range is determined to be the drive range and the vehicle is determined to be stopped (that is, in the neutral state of the clutch), and controls the lock-up clutch so that the lock-up clutch is at least engaged in a slip region in which a predetermined torque capacity is obtained, when the operation intended for starting the vehicle is detected. That is, the lock-up clutch is engaged before the start of the vehicle. Therefore, the lock-up clutch can be promptly engaged in the slip region even immediately after the start (delay in the engagement of the lock-up clutch can be prevented). Thus, revving up of the driving source immediately after the start can be prevented, whereby fuel consumption of the vehicle can be improved. In addition, while a rotation speed of the driving source is low, an output torque required by a driver is small and the lock-up clutch receives a smaller torque than the predetermined torque capacity. Therefore, the lock-up clutch is stably held in the engaged state, thereby making it possible to start the vehicle without an occurrence of shake-back shock and to improve ride comfort.

According to a second aspect of the present invention, if an output torque of the driving source and a torque capacity of the clutch are smaller than the predetermined torque capacity of the lock-up clutch, the vehicle is started while slip-controlling the clutch with the lock-up clutch engaged. Therefore, for example, if the required torque required by the driver is small, the lock-up clutch does not slip as described above, thus making it possible to prevent the revving up of the driving source, and to improve the fuel consumption of the vehicle.

According to a third aspect of the present invention, if the output torque of the driving source and the torque capacity of the clutch are larger than the predetermined torque capacity of the lock-up clutch, the vehicle is started by using a torque amplifying function of a torque converter while slipping the lock-up clutch. Therefore, for example, if the required torque required by the driver is small, the lock-up clutch does not slip as described above, thus making it possible to prevent the revving up of the driving source, and to improve the fuel consumption of the vehicle. In addition, for example, if the required torque required by the driver is large, a large output torque can be obtained, thereby making it possible to ensure driveability.

According to a fourth aspect of the present invention, if the output torque of the driving source and the torque capacity of the clutch are larger than the predetermined torque capacity of the lock-up clutch, the vehicle is started by using the torque amplifying function of the torque converter while releasing the lock-up clutch by the lock-up clutch control unit. Therefore, for example, if the required torque required by the driver is small, the lock-up clutch does not slip as described above, thus making it possible to prevent the revving up of the driving source, and to improve the fuel consumption of the vehicle. In addition, for example, if the required torque required by the driver is large, a large output torque can be obtained, thereby making it possible to ensure driveability. In addition, because the lock-up clutch is released without being slipped when starting the vehicle by using the torque amplifying function of the torque converter, drag by the lock-up clutch can be eliminated, whereby a larger torque amplifying function can be obtained.

According to a fifth aspect of the present invention, the lock-up clutch control unit controls the release, the slip, and the engagement of the lock-up clutch by referring to a lock-up control map based on the required output and a vehicle speed. Therefore, the engagement state of the lock-up clutch can be controlled without conducting complicated calculations. In addition, because a release region of the lock-up clutch corresponds to the state in which the output torque of the driving source and the torque capacity of the clutch are larger than the predetermined torque capacity of the lock-up clutch, the vehicle can be started by using the torque amplifying function of the torque converter in the released state of the lock-up clutch.

BRIEF DESCRIPTION OF THE DRAWINGS

FIG. 3 is an engagement table of an automatic transmission to which the present invention can be applied;

DETAILED DESCRIPTION OF THE EMBODIMENT

Figure 1:
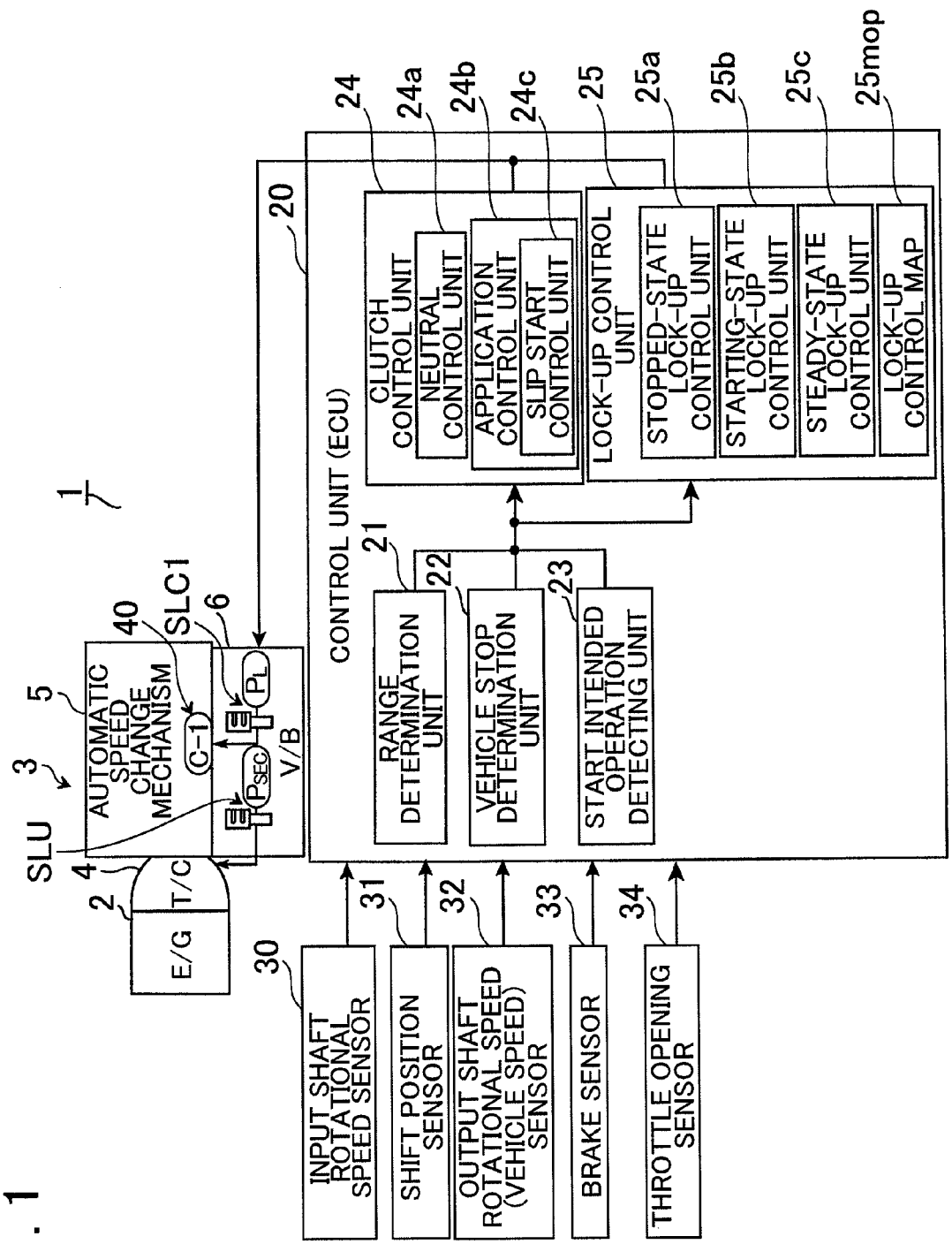
FIG. 1 is a block diagram showing a control apparatus of an automatic transmission according to the present invention.

An embodiment according to the present invention will be described below with reference to FIGS. 1 to 17.

[Outline of Automatic Transmission]

First of all, an outline structure of an automatic transmission 3 to which the present invention can be applied will be described with reference to FIG. 2. As shown in FIG. 2, the automatic transmission 3 preferably used for a vehicle of an FF type (front engine, front drive), for example, has an input shaft 8 for the automatic transmission that can be connected to an output shaft 2a of an engine (E/G) 2 (refer to FIG. 1) serving as a driving source, and also has a torque converter (fluid transmission apparatus) (T/C) 4 and an automatic speed change mechanism 5 that are disposed about the axial direction of the input shaft 8.

The torque converter 4 is interposed between the engine 2 and the automatic speed change mechanism 5 to be described in detail later, and has a pump impeller 4a connected to the input shaft 8 of the automatic transmission 3, a turbine runner 4b to which rotation of the pump impeller 4a is transmitted via working fluid, and a stator 4c generating a torque amplifying function while redirecting the oil flow returning from the turbine runner 4b to the pump impeller 4a. The turbine runner 4b is connected to an input shaft 10 of the automatic speed change mechanism 5 arranged coaxially with the input shaft 8. The torque converter 4 has also a lock-up clutch 7. When the lock-up clutch 7 is engaged, rotation of the input shaft 8 of the automatic transmission 3 is directly transmitted to the input shaft 10 of the automatic speed change mechanism 5.

Note that the stator 4c is structured so as to be held stationary to generate the torque amplifying function by receiving a reaction force of the oil flow in the state in which rotation of the turbine runner 4b is slower than the rotation of the pump impeller 4a, and to freely rotate so that the oil flow does not act in the negative direction in the state in which the rotation of the turbine runner 4b is faster than the rotation of the pump impeller 4a.

The automatic speed change mechanism 5 is provided with a planetary gear SP and a planetary gear unit PU on the input shaft 10. The planetary gear SP is a so-called single-pinion planetary gear that is provided with a sun gear S1, a carrier CR1, and a ring gear R1, and, in the carrier CR1, with a pinion P1 meshing with the sun gear S1 and the ring gear R1.

The planetary gear unit PU is a so-called Ravigneaux type planetary gear that has a sun gear S2, a sun gear S3, a carrier CR2, and a ring gear R2 as four rotational elements, and, in the carrier CR2, has a long pinion PL meshing with the sun gear S2 and the ring gear R2, and a short pinion PS meshing with the sun gear S3, in a manner meshing with each other.

The sun gear S1 of the planetary gear SP is held stationary by being connected to a boss portion fixed to a transmission case 9 in an integrated manner. The ring gear R1 makes the same rotation (hereinafter called "input rotation") as rotation of the input shaft 10. The carrier CR1 makes a decelerated rotation that is decelerated from the input rotation by the sun gear S1 thus held stationary and the ring gear R1 thus making the input rotation, and is connected to a clutch C-1 and a clutch C-3.

The sun gear S2 of the planetary gear unit PU is connected to a brake B-1 composed of a band brake, thereby being fixable to the transmission case, and also connected to the clutch C-3, thereby being receivable of the decelerated rotation of the carrier CR1 via the clutch C-3. The sun gear S3 is connected to the clutch C-1, thereby being receivable of the decelerated rotation of the carrier CR1.

The carrier CR2 is connected to a clutch C-2 receiving the rotation of the input shaft 10 so as to be receivable of the input rotation via the clutch C-2, and also connected to a one-way clutch F-1 and a brake B-2, thereby being restricted of rotation in one direction relative to the transmission case via the one-way clutch F-1, and also being capable of being held stationary via the brake B-2. The ring gear R2 is connected to a counter gear 11. The counter gear 11 is connected to a driving wheel via a countershaft and a differential device that are not shown.

As shown in an operation table of FIG. 3, the automatic transmission 3 structured as described above establishes gear ratios of shift speeds at first to sixth forward speeds and a reverse speed, with good step ratios, by operating the clutches C-1 to C-3, the brakes B-1 and B-2, and the one-way clutch F-1. Shift control is executed by switching engagement of the clutches C-1 to C-3, and the brakes B-1 and B-2 among each other, and each of the shift speeds is achieved by engaging two of the clutches C-1 to C-3, and the brakes B-1 and B-2, except during driving at the first forward speed (such as during a start).

[Structure of Control Apparatus of Automatic Transmission]

Subsequently, a control apparatus 1 of an automatic transmission according to the present invention will be described, referring mainly to FIG. 1.

Figure 2:
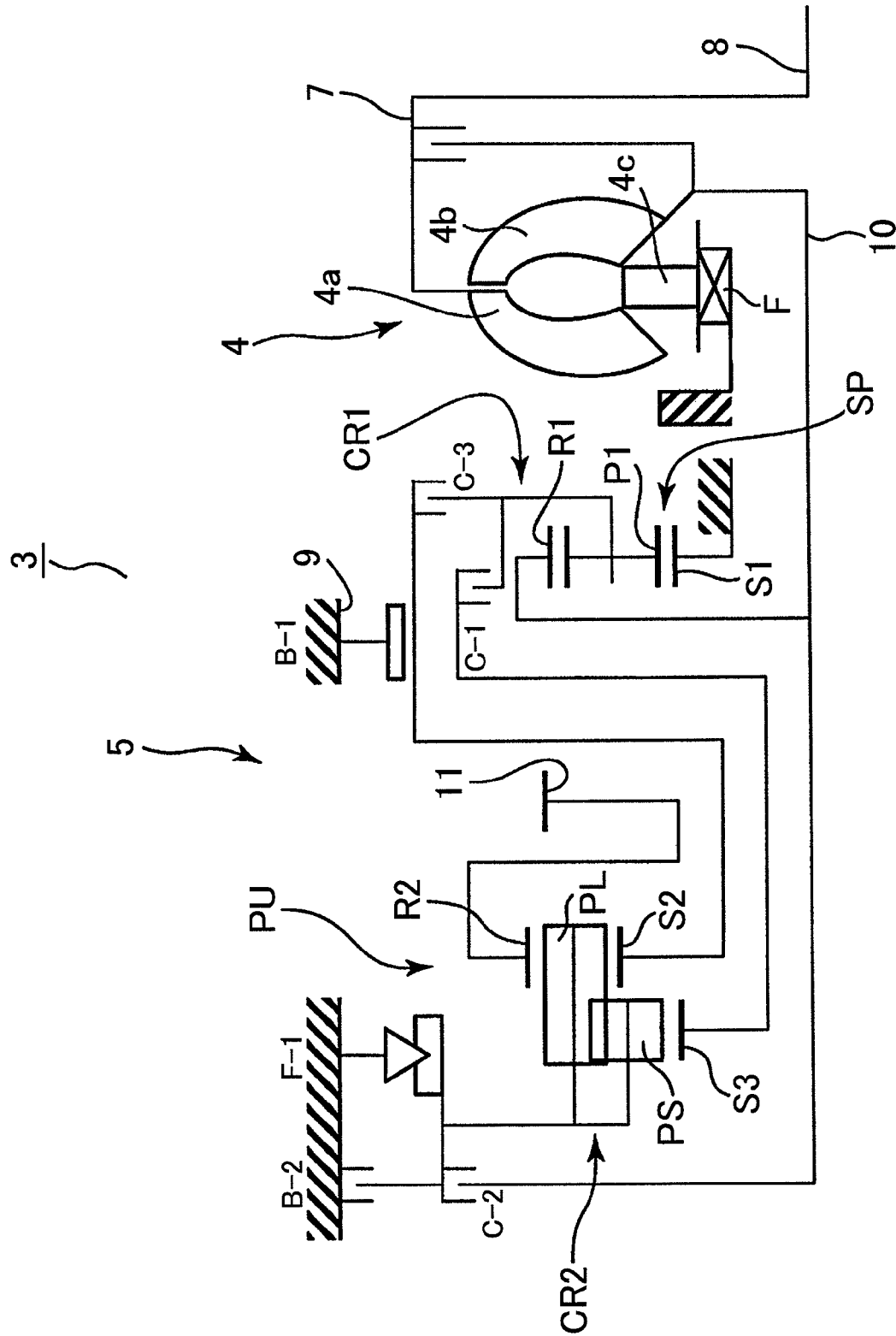
FIG. 2 is a skeleton diagram showing an automatic transmission to which the present invention can be applied.

As shown in FIG. 1, the control apparatus 1 of an automatic transmission has a control unit (ECU) 20. The control unit 20 is connected from an input shaft rotational speed sensor 30, a shift position sensor 31, an output shaft rotational speed (vehicle speed) sensor (vehicle speed detecting unit) 32, a brake sensor 33, a throttle opening sensor (required output detecting unit) 34, and so forth. The control unit 20 is also connected to a hydraulic control device (V/B) 6 that hydraulically controls the clutches C-1 to C-3, the brakes B-1 and B-2, the lock-up clutch 7, and so forth of the automatic speed change mechanism 5.

The hydraulic control device 6 is provided with a plurality of linear solenoid valves that control engagement pressures supplied to hydraulic servos of the clutches C-1 to C-3, and the brakes B-1 and B-2. Particularly, the hydraulic control device 6 is provided with a linear solenoid valve SLC1 that is capable of regulating and delivering an engagement pressure PC1 supplied to a hydraulic servo 40 of the clutch C-1 by using, for example, a line pressure PL as a source pressure, and provided with a linear solenoid valve SLU that is capable of regulating and delivering an engagement pressure PL-UP (internal pressure of the torque converter 4) of the lock-up clutch 7 by using, for example, a secondary pressure PSEC as a source pressure. The linear solenoid valve SLC1 and the linear solenoid valve SLU are structured to be capable of being controlled by a command from the control unit 20.

The control unit 20 is provided with a range determination unit 21, a vehicle stop determination unit 22, a start intended operation detecting unit 23, a clutch control unit 24, and a lock-up control unit 25. The clutch control unit 24 is provided with an application control unit 24b having a neutral control unit 24a and a slip start control unit 24c. The lock-up control unit 25 is provided with a stopped-state lock-up control unit 25a, a starting-state lock-up control unit 25b, a steady-state lock-up control unit 25c, and lock-up control map 25map. The clutch control unit 24 of the control unit 20 issues a control command to the linear solenoid valve SLC1, thereby freely controlling the hydraulic pressure command value for the engagement pressure PC1 so as to freely control an engagement/disengagement state of the clutch C-1, that is, a stroke state of a piston of the hydraulic servo 40, or a pressure state against friction plates. The lock-up control unit 25 issues a control command to the linear solenoid valve SLU, thereby freely controlling the hydraulic pressure command value for the engagement pressure PL-UP so as to freely control a pressure state of a lock-up piston (not shown) of the lock-up clutch 7, and thus, freely controlling engagement/disengagement states, that is, a released state (release region), a slip state (slip region), and an engaged state (engagement region) of the lock-up clutch 7.

The input shaft rotational speed sensor 30 detects a rotational speed of the input shaft 10 of the automatic speed change mechanism 5 (that is, a turbine speed Nt of the turbine runner 4b). The shift position sensor 31 detects an operating position of a shift lever (or a position of a manual shaft coupled with the shift lever) located at a driver's seat (not shown). The output shaft rotational speed sensor 32 detects a rotational speed of the counter gear 11 (or the countershaft) of the automatic speed change mechanism 5 (that is, a vehicle speed V, or an output shaft speed Nout). The brake sensor 33 detects a depression pressure state of a brake pedal (not shown) (at least, a brake ON/OFF state). The throttle opening sensor 34 detects a throttle opening (required output of the driving source) TH, based mainly on an accelerator operation amount.

The range determination unit 21 determines at which range the shift position is placed among shift ranges including a P (parking) range (non-drive range), an R (reverse) range (drive range), an N (neutral) range (non-drive range), and a D (drive) range (drive range), based on the shift lever position detection by the shift position sensor 31. The vehicle stop determination unit 22 determines whether or not the vehicle is in a stopped state, based on a detection result of the output shaft rotational speed (that is, the vehicle speed V) detected by the output shaft rotational speed sensor 32. The start intended operation detecting unit 23 detects an existence of a driver's operation intended for starting in any one of cases including, for example, a case in which the driver has released the brake on a sloped road, and the vehicle speed V becomes above zero (the vehicle is no longer in a stopped state), a case in which the brake is turned OFF, and a case in which the throttle opening is turned ON (no longer at 0 percent).

[Control of Lock-up Clutch]

Figure 4:
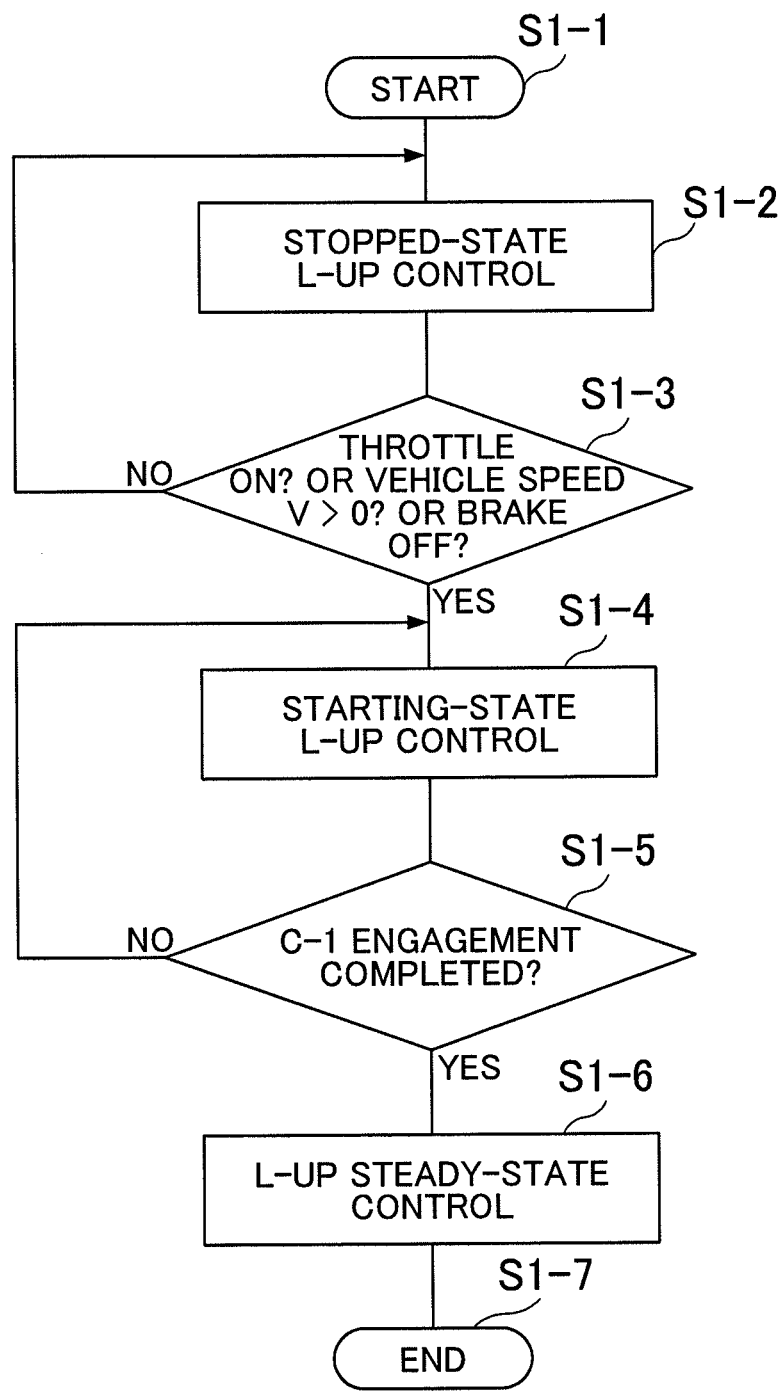
FIG. 4 is a flow chart showing control of a lock-up clutch.

Next, control of the lock-up clutch 7 performed when the vehicle starts from the stopped state, that is, lock-up control performed by the lock-up control unit 25 will be described along FIG. 4 with reference to FIG. 1. For example, when the vehicle stop determination unit 22 determines that the vehicle stops in the state in which the range determination unit 21 determines the shift range to be the D range (including the case of shifting from the N range to the D range), the control of the lock-up clutch according to the present invention is started (S1-1) as shown in FIG. 4. Then, the stopped-state lock-up control unit 25a of the lock-up control unit 25 performs stopped-state lock-up control (stopped-state L-UP control) (S1-2) in which a lock-up relay valve (not shown) is switched to a lock-up position, a fast fill (so-called a play reduction operation) of the lock-up clutch 7 is performed, and then, the lock-up clutch 7 is engaged so as to have a small torque capacity. In this operation, the clutch C-1 is under in-neutral control to be described later, and the input shaft 10 (turbine runner 4b) of the automatic speed change mechanism 5 is substantially freely rotating. Therefore, the lock-up clutch 7 is placed in the engaged state without slipping.

After placing the lock-up clutch 7 in the engaged state with the small torque capacity as described above, the process proceeds to step S1-3 as shown in FIG. 4. Then, the start intended operation detecting unit 23 waits until any one of the following detections is made (No in S1-3): the throttle opening sensor 34 detects that the throttle is ON; the output shaft rotational speed (vehicle speed) sensor 32 detects that the vehicle speed V is larger than zero; and, the brake sensor 33 detects that the brake is OFF. Then, if detecting any one of the states of the throttle being ON, the vehicle speed being larger than zero, and the brake being OFF (Yes in step S1-3), the start intended operation detecting unit 23 terminates the stopped-state lock-up control by determining that the driver intends to start the vehicle, and then, the process proceeds to step S1-4. If detecting the driver's intention for starting as described above, the clutch control unit 24 to be described later terminates the in-neutral control, and then, shifts the process to application control (engagement control of the clutch C-1).

After proceeding to step S1-4, the starting-state lock-up control unit 25b of the lock-up control unit 25 starts starting-state lock-up control (starting-state L-UP control). Then, the starting-state lock-up control unit 25b refers to the lock-up control map 25map (refer to FIGS. 10 and 12) to be described later in detail, and increases the engagement pressure PL-UP of the lock-up clutch 7 to a predetermined command value in the form of a command to the linear solenoid valve SLU, thereby engaging the lock-up clutch 7 with a predetermined torque capacity so that the lock-up clutch 7 is placed in the slip region based on a relation between the vehicle speed V and the throttle opening TH.

After placing the lock-up clutch 7 in the engaged state with the predetermined torque capacity as described above, the process proceeds to step S1-5 shown in FIG. 4. Here, the lock-up control unit 25 waits until it is detected that the clutch control unit 24 to be described later in detail has terminated the application control of the clutch C-1, and the engagement of the clutch C-1 is completed (No in S1-5). Then, if the completion of the engagement of the clutch C-1 is detected (Yes in S1-5), the lock-up control unit 25 terminates the starting-state lock-up control, and the process proceeds to step S1-6. Then, the process shifts to lock-up steady-state control (L-UP steady-state control) performed by the steady-state lock-up control unit 25c for steady-state running (normal running), and then, terminates the control of the lock-up clutch 7 at the start (S1-7). Note that, in the lock-up steady-state control, ON-OFF-slip control of the lock-up clutch 7 is appropriately performed based on the vehicle speed V and the throttle opening TH while referring to the lock-up control map 25map and so forth.

[Control of Clutch C-1]

Figure 5:
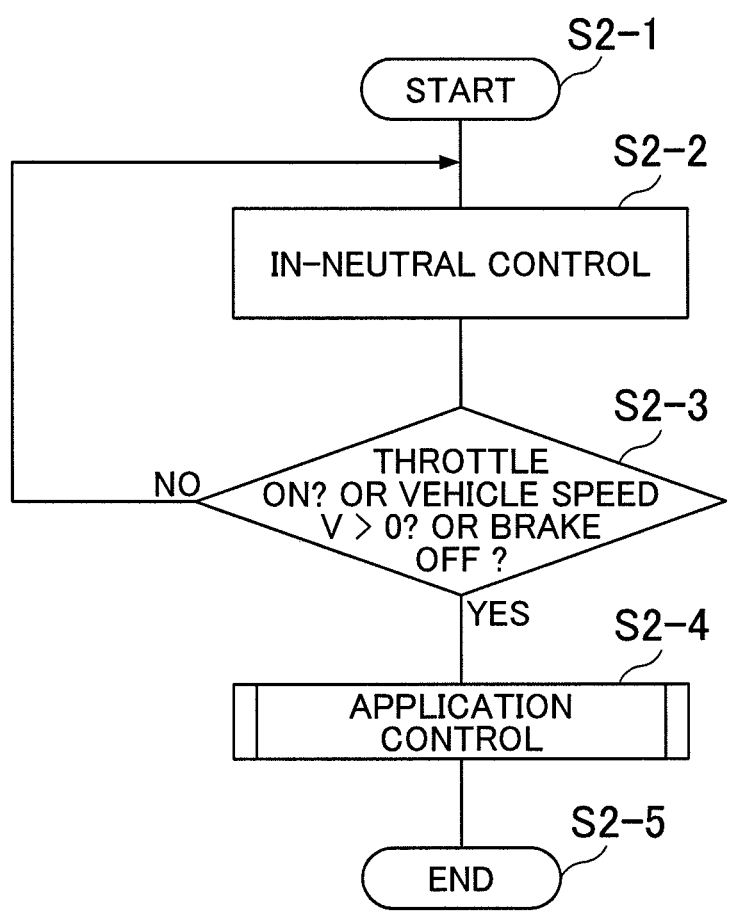
FIG. 5 is a flow chart showing control of a clutch C-1.

Next, description will be made of the control of the clutch C-1 performed when the vehicle starts from the stopped state, that is, the in-neutral control and the application control performed by the clutch control unit 24, along FIGS. 5 to 7 with reference to FIG. 1. For example, when the vehicle stop determination unit 22 determines that the vehicle stops in the state in which the range determination unit 21 determines the shift range to be the D range (including the case of N-D shifting while the vehicle stops), the control of the clutch C-1 is started (S2-1), and then, the neutral control unit 24a of the clutch control unit 24 starts the in-neutral control (S2-2), as shown in FIG. 5. After starting the in-neutral control, the neutral control unit 24a performs, for example, by issuing a control command to the linear solenoid valve SLC1, release control that controls the engagement pressure PC1 of the clutch C-1 to a pressure lower than a stroke-end pressure (that is, a state in which the play reduction operation by the hydraulic servo 40 has been performed); that is, the neutral control unit 24a slightly releases the clutch C-1 so that the automatic speed change mechanism 5 is placed completely in the neutral state. By making the engagement pressure PC1 of the clutch C-1 lower than the stroke-end pressure in this way, a drag loss of the clutch C-1 under the neutral control can be eliminated completely, thereby making it possible to reduce a load to the engine 2, that is, to improve fuel consumption of the vehicle.

After the clutch control unit 24 performs the in-neutral control, the process proceeds to step S2-3. Then, the start intended operation detecting unit 23 waits until any one of the following detections is made (No in S2-3): the throttle opening sensor 34 detects that the throttle is ON; the output shaft rotational speed (vehicle speed) sensor 32 detects that the vehicle speed V is larger than zero; and, the brake sensor 33 detects that the brake is OFF. Then, if detecting any one of the states of the throttle being ON, the vehicle speed being larger than zero, and the brake being OFF (Yes in step S2-3), the start intended operation detecting unit 23 determines to terminate the in-neutral control by determining that the driver intends to start the vehicle, and then, the process proceeds to step S2-4.

Figure 6:
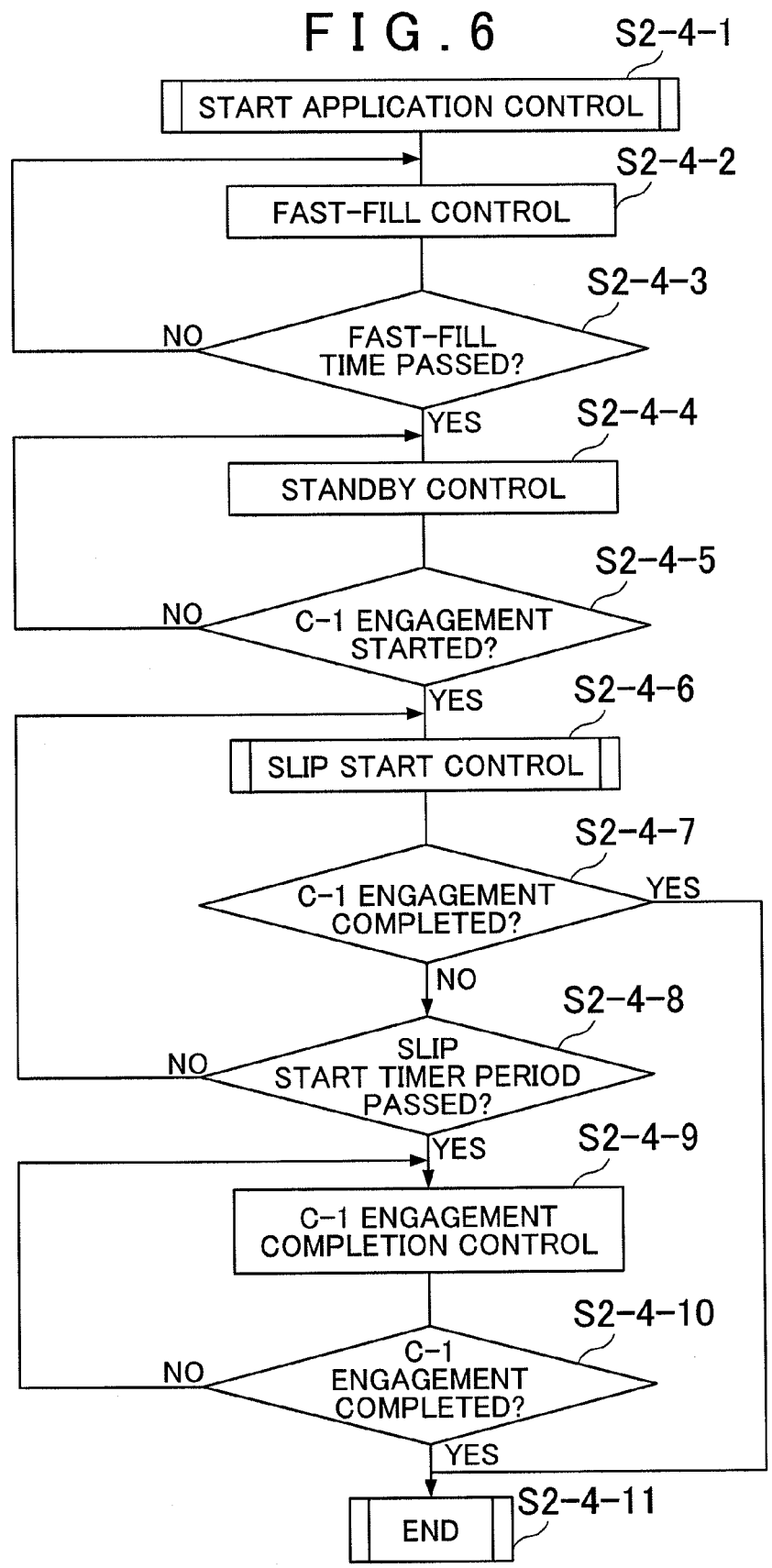
FIG. 6 is a flow chart showing application control of the clutch C-1.

At step S2-4, the application control unit 24b of the clutch control unit 24 starts the application control of the clutch C-1 (S2-4-1) as shown in FIG. 6. Then, the application control unit 24b first starts fast-fill control for performing the play reduction operation of the hydraulic servo 40 of the clutch C-1 (S2-4-2). In the fast-fill control, the application control unit 24b sets the magnitude of the hydraulic pressure command value to be output and a time (fast-fill time) for which the fast fill is performed based on, for example, oil temperature and time for which the in-neutral control has been performed. Then, the application control unit 24b determines whether or not the fast-fill time has passed in step S2-4-3, and continues the fast-fill control until the fast-fill time passes (No in S2-4-3).

Thereafter, if the fast-fill time has passed (Yes in S2-4-3), the fast fill (play reduction operation) must have been finished so that the piston of the hydraulic servo 40 of the clutch C-1 is placed on a slightly engaged side of the stroke end (that is, so that the clutch C-1 is placed in a dragged state). Therefore, the fast-fill control is terminated, and then the process proceeds to step S2-4-4.

At step S2-4-4, the application control unit 24b starts standby control that maintains the hydraulic pressure command value for the engagement pressure PC1 at a standby pressure higher than the stroke-end pressure. Thereby, in the clutch C-1, the piston is gradually advanced from the position for the dragged state toward the engaged side. Then, based on whether or not any change has occurred in the turbine speed Nt detected by the input shaft rotational speed sensor 30, the application control unit 24b determines whether or not the clutch C-1 has started to be engaged (that is, whether or not the state has changed to the slip state) (S2-4-5) while maintaining the standby pressure until the clutch C-1 starts to be engaged (No in S2-4-5). Thereafter, if the clutch C-1 starts to be engaged (Yes in S2-4-5), the standby control by the application control unit 24b is terminated, and then the process proceeds to step S2-4-6. Note that the standby pressure may be set after being corrected by learning based on, for example, an engagement timing in the engagement control (which may be the engagement control in normal shifting) of the clutch C-1 performed at the previous time.

At step S2-4-6, the slip start control unit 24c of the application control unit 24b starts slip start control. After starting the slip start control, the slip start control unit 24c first sets a slip start timer serving as a forced termination time in order to prevent the slip start control from being prolonged from any cause, and then, starts the slip start control, such as shown in FIG. 7 (S2-4-6-1). Note that the slip start control shown in FIG. 7 is an example shown as one (shown in FIG. 15) of three calculation methods (refer to FIGS. 15 to 17) to be described later in detail.

That is, this slip start control is control that establishes the speed ratio at the start, that is, the gear ratio of the first forward speed, by slip-controlling the clutch C-1 so as to increase the rotational speed of the output shaft 11 (that is, the output shaft speed Nout) of the automatic speed change mechanism 5 without reducing the rotational speed of the input shaft 10 (that is, the turbine speed Nt) of the automatic speed change mechanism 5. Thereby, the turbine speed Nt can be prevented from being reduced while preventing an inertial shock caused by a temporary drop in rotational speed of a rotational system from the turbine runner 4b to an input-side member of the clutch C-1 in the automatic speed change mechanism 5. Therefore, the gear ratio of the first forward speed can be established by increasing the output shaft speed Nout while keeping the lock-up clutch 7 in the engaged state.

In order to make it possible to start the vehicle by slip-controlling the clutch C-1 so as not to reduce the turbine speed Nt as described above, for example, as shown in FIG. 7, an input torque transmitted from the torque converter 4 and the lock-up clutch 7 is calculated, and a torque capacity (that is, a rotation holding torque capacity) of the clutch C-1 is calculated to hold the output shaft speed Nout so as not be changed (S2-4-6-2). Furthermore, a target turbine speed Ntarg and a target termination time TA are set, and an inertial torque of the rotational system of the automatic speed change mechanism 5 when the turbine speed reaches the target turbine speed Ntarg at the target termination time TA is calculated. Then, based on the inertial torque, a torque capacity (that is, a torque capacity required for target rotation change) of the clutch C-1 is calculated at which a change in the output shaft speed Nout coincides with a target rotation change (S2-4-6-3). A required hydraulic pressure of the clutch C-1 is calculated from a total torque of the rotation holding torque capacity and the torque capacity required for target rotation change, and, by the required hydraulic pressure thus calculated, the engagement pressure PC1 of the hydraulic servo 40 of the clutch C-1 is hydraulically controlled (S2-4-6-4). Then, the slip start control is terminated (S2-4-6-5), and the process proceeds to step S2-4-7 shown in FIG. 6.

In step S2-4-7, the application control unit 24b determines whether or not the engagement of the clutch C-1 is completed by the slip start control described above, for example, based on that a gear ratio calculated from the turbine speed Nt and the output shaft speed Nout has reached the gear ratio of the first forward speed. If the engagement of the clutch C-1 is not completed (the gear ratio is not established) (No in S2-4-7), the process proceeds to step S2-4-8 to determine whether or not the period of the slip start timer has passed, and, if the period of the slip start timer has not passed (No in S2-4-8), the slip start control is continued.

Then, if the gear ratio calculated from the turbine speed Nt and the output shaft speed Nout has reached the gear ratio of the first forward speed, and thus, completion of the engagement of the clutch C-1 is detected (Yes in S2-4-7), the slip start control unit 24c issues a command to the linear solenoid valve SLC1 to rapidly raise the engagement pressure PC1 of the clutch C-1 at a predetermined gradient to a pressure equivalent to the line pressure PL, and the engagement of the clutch C-1 is finished. Then, the application control is terminated (S2-4-11), and all of the controls of the clutch C-1 are terminated (S2-5).

If, on the other hand, the period of the slip start timer has passed (Yes in S2-4-8), the process proceeds to step S2-4-9 to shift to engagement completion control of the clutch C-1. Then, in the engagement completion control of the clutch C-1, the slip start control unit 24c issues a command to the linear solenoid valve SLC1 to raise the engagement pressure PC1 of the clutch C-1 at a predetermined gradient, waits until the engagement of the clutch C-1 is completed (until the gear ratio is established) (No in S2-4-10), and, if the engagement of the clutch C-1 is completed (Yes in S2-4-10), raises the engagement pressure PC1 eventually to the pressure equivalent to the line pressure PL. Then, the application control described above is terminated (S2-4-11). Thus, all of the above-described controls of the clutch C-1 performed when the vehicle starts from the stopped state are terminated (S2-5).

[Example of Starting Running in Engaged State of Lock-up Clutch at Low Throttle Opening]

Figure 8:
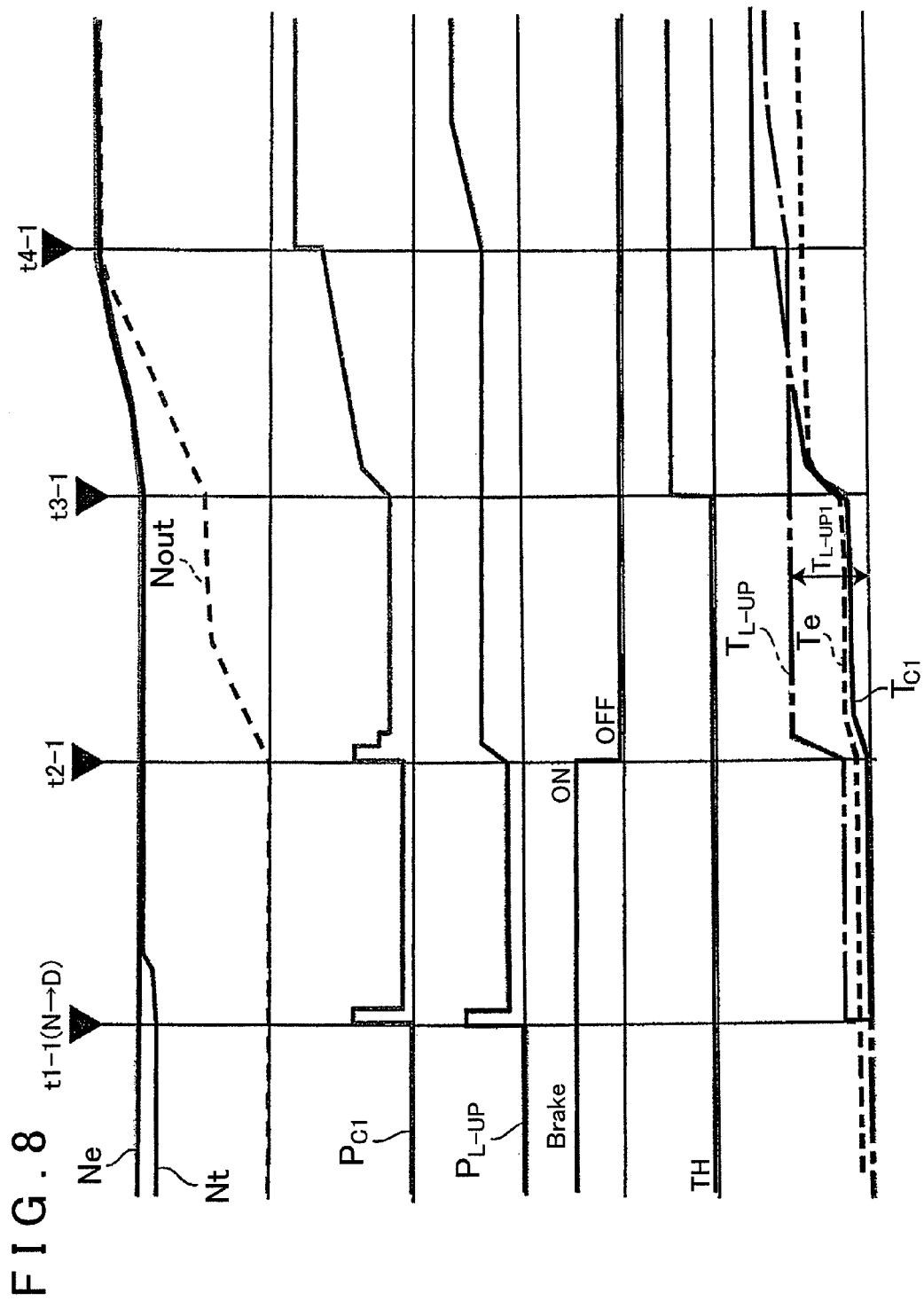
FIG. 8 is a timing chart showing a start in an engaged state of the lock-up clutch when a throttle opening is low.

Subsequently, description will be made, referring to FIG. 8, of an example of running in the case in which the clutch C-1 is engaged in a slipping manner while keeping the lock-up clutch in the engaged state, when the driver depresses a pedal to the low throttle opening TH at the vehicle start. For example, in the state in which the vehicle stops with the foot brake (Brake) depressed (ON) in the N range, the engagement pressure PC1 of the clutch C-1 is zero so that the clutch C-1 is released, and also the engagement pressure PL-UP of the lock-up clutch 7 is zero so that the lock-up clutch 7 is also released. Therefore, an engine speed Ne in an idle state is transmitted through fluid from the pump impeller 4a to the turbine runner 4b in the torque converter 4, and the turbine speed Nt is slightly lower than the engine speed Ne.

For example, when the driver operates the shift lever (not shown) from the N range t the D range (N-D) at time t1-1, the range determination unit 21 determines the shift range to be the D range (drive range) based on the detection by the shift position sensor 31, and, based on the determination, the stopped-state lock-up control unit 25a of the lock-up control unit 25 determines to start the stopped-state lock-up control (S1-2). Then, the fast fill (play reduction operation) is performed by issuing a control command to the linear solenoid valve SLU so as to control the engagement pressure PL-UP, and the lock-up clutch 7 is placed in a slightly engaged state at a very small torque capacity TL-UP.

When the range determination unit 21 determines the shift range to be the D range (drive range), the foot brake is ON, the throttle opening TH is zero percent, and the output shaft speed Nout (vehicle speed V) is zero in this state. Therefore, the neutral control unit 24a of the clutch control unit 24 determines to start the in-neutral control (S2-2), and, after performing the fast fill (play reduction operation) by issuing a control command to the linear solenoid valve SLC1 so as to control the engagement pressure PC1, waits in a state immediately before engaging the clutch C-1, while keeping the clutch C-1 in the released state at the engagement pressure PC1 slightly lower than the stroke-end pressure at which the play reduction operation of the clutch C-1 is performed.

When the start intended operation detecting unit 23 detects the brake to be turned OFF (Yes in S1-3) at time t2-1, it is determined that the driver intends to start the vehicle. Accordingly, the starting-state lock-up control unit 25b of the lock-up control unit 25 determines to start the starting-state lock-up control (S1-4), and the lock-up clutch 7 is placed in the engaged state in the slip region so as to have the predetermined torque capacity TL-UP1. At the same time, the starting-state lock-up control unit 25b determines the engagement state (ON, OFF, or slip state) of the lock-up clutch 7 by referring to the lock-up control map 25map shown in FIG. 10. First of all, from this time t2-1 to time t3-1, the engagement state in the slip region is selected, because the throttle opening TH is zero percent, and the vehicle speed V (output shaft speed Nout) is small.

On the other hand, when the start intended operation detecting unit 23 detects the brake to be turned OFF (Yes in S2-3) at the time t2-1, it is determined that the driver intends to start the vehicle. Accordingly, the application control unit 24b of the clutch control unit 24 performs the fast-fill control (S2-4-2), and then, performs the above-described standby control (S2-4-4). Moreover, the slip start control unit 24c starts the slip start control (S2-4-6) so as to initiate the start of the vehicle (rise of the output shaft speed Nout) while slip-controlling the clutch C-1.

From this time t2-1 to the time t3-1, the lock-up clutch 7 is in the engaged state at the predetermined torque capacity TL-UP1 as described above, and a torque capacity TC1 of the clutch C-1 and an input torque Te from the engine 2 (hereinafter called "engine torque Te") do not exceed the torque capacity TL-UP of the lock-up clutch 7. Therefore, the lock-up clutch 7 does not slip, and the engine speed Ne is thereby the same as the turbine speed Nt; that is, the engine 2 is prevented from revving up.

Further, when the driver depresses the accelerator pedal by a small operation amount to slightly increase the throttle opening TH at the time t3-1, the slip start control unit 24c calculates the torque capacity TC1 of the clutch C-1 by using a calculation method to be described later in detail, and controls the engagement pressure PC1 so as to achieve the torque capacity TC1 thus calculated. As a result, the engagement pressure PC1 and the torque capacity TC1 increase in response to the throttle opening TH. However, in the example of running shown in FIG. 8, the torque capacity TC1 of the clutch C-1 does not exceed the torque capacity TL-UP of the lock-up clutch 7; that is, the engine speed Ne and the turbine speed Nt rise as the engine torque Te rises.

Then, the output shaft speed Nout also rises so as to progressively establish the gear ratio of the first forward speed (to advance a shifting progression ratio) as the engagement state of the clutch C-1 progresses. Then, when the gear ratio of the first forward speed is established at time t4-1, the clutch C-1 is determined to be completely engaged (Yes in S2-4-7 and Yes in S1-5). Accordingly, the application control of the clutch C-1 by the application control unit 24b ends (S2-5), and the starting-state lock-up control (S1-4) by the starting-state lock-up control unit 25b ends. Thus, the process shifts to the lock-up steady-state control (S1-6) performed by the steady-state lock-up control unit 25c, that is, the vehicle state shifts to the normal running state. In this case, when the vehicle speed V has increased to exceed a determination line for a lock-up ON (Lup ON) in the lock-up control map 25map shown in FIG. 10, the steady-state lock-up control unit 25c determines to turn ON the lock-up clutch 7, whereby the engagement pressure PL-UP is swept up, and the lock-up clutch 7 is engaged (turned ON). Thereby, the steady-state running state at the first forward speed with the lock-up ON is achieved.

Figure 10:
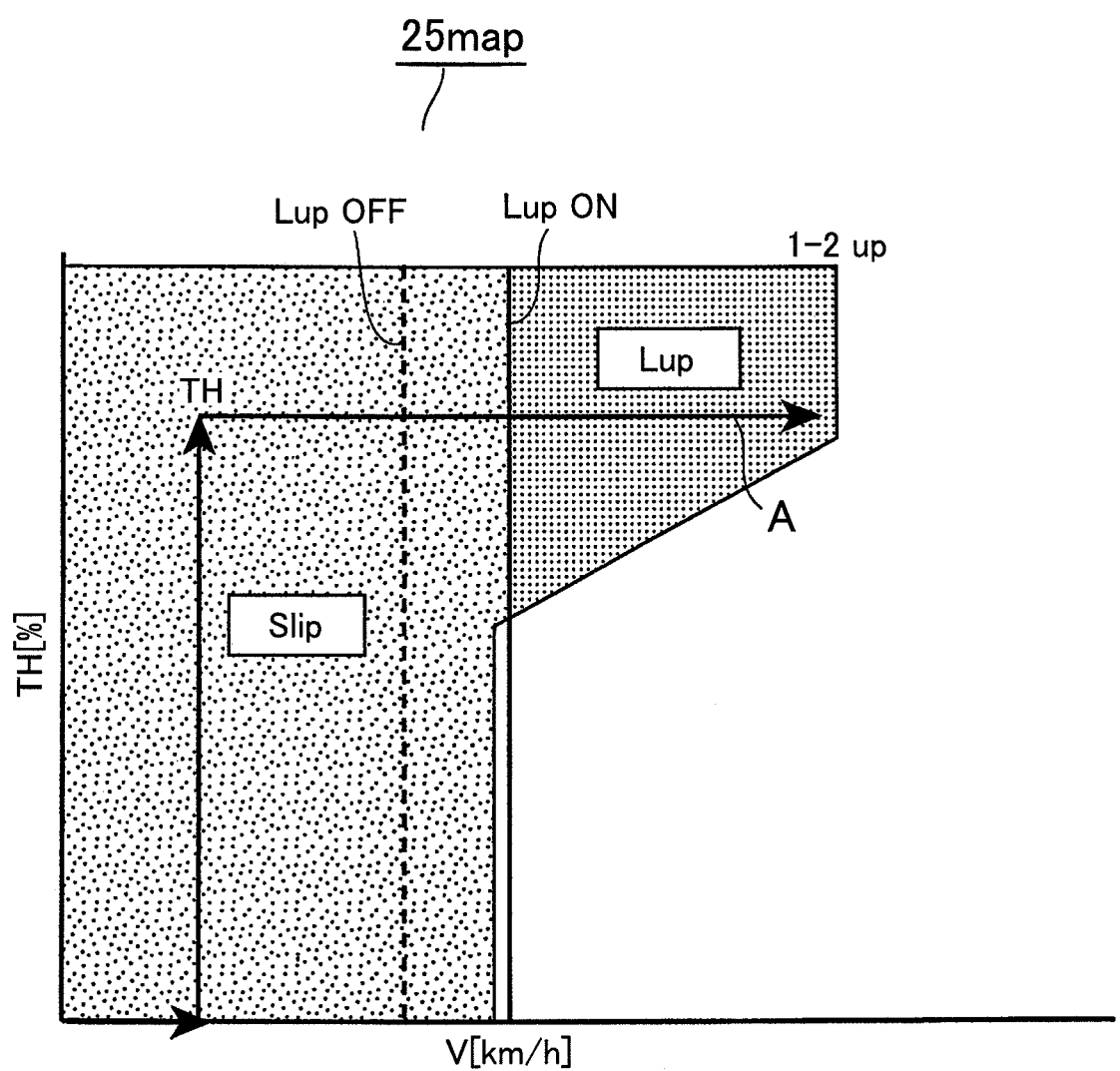
FIG. 10 is a diagram showing a lock-up control map for controlling the lock-up clutch in the slip region at the start.

It should be noted that, in the lock-up control map 25map shown in FIG. 10, if the steady-state lock-up control unit 25c has started the lock-up steady-state control, the lock-up clutch 7 is determined to be engaged when the determination line for the lock-up ON (Lup ON), which is shown by a solid line in the drawing, is crossed rightward in the drawing, whereas the lock-up clutch 7 is determined to be released when a determination line drawn by a dotted line in the drawing for a lock-up OFF (Lup OFF) is crossed leftward in the drawing.

[Example of Starting Running in Slip State of Lock-up Clutch at High Throttle Opening]

Figure 9:
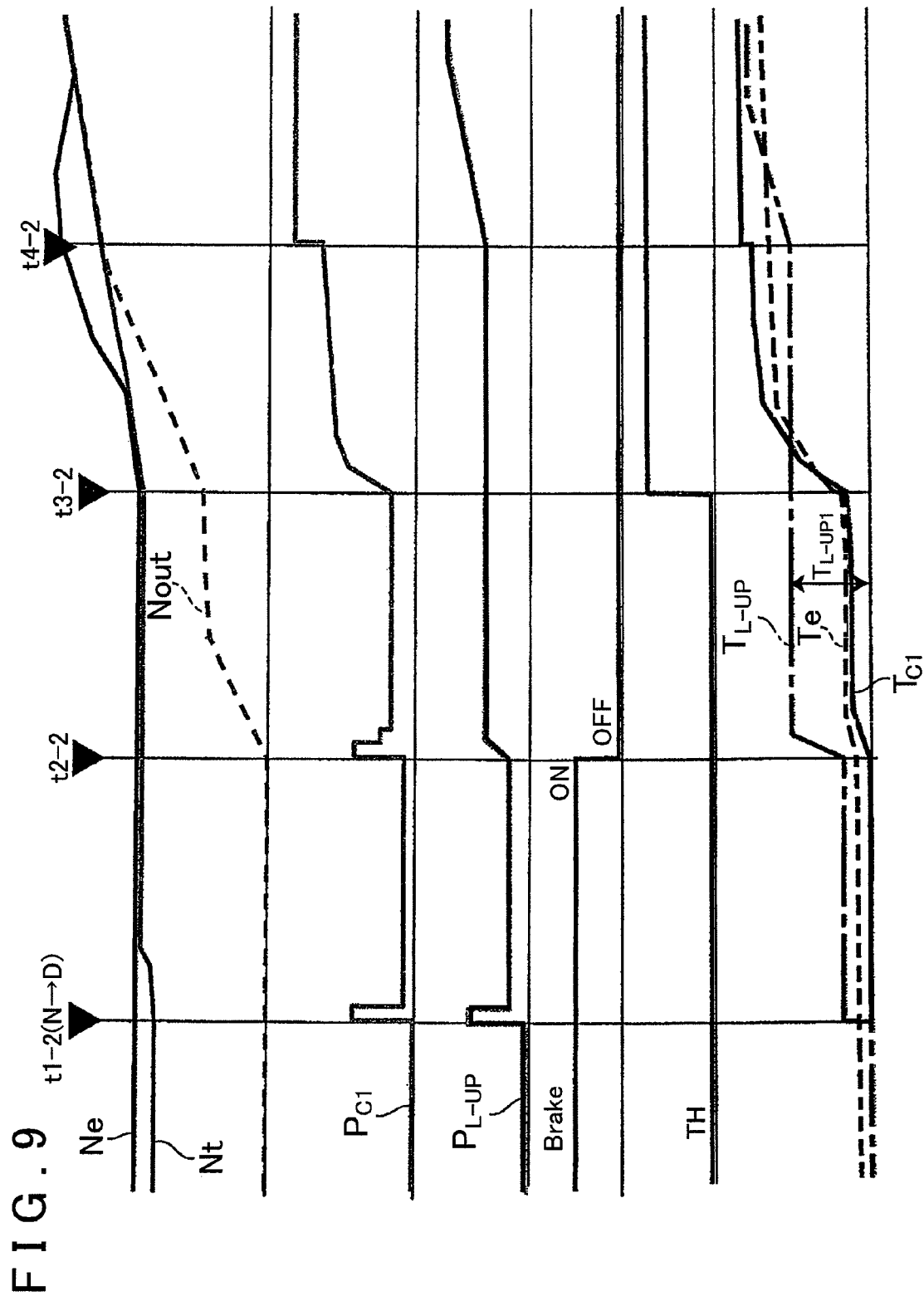
FIG. 9 is a timing chart showing a start in a slip state of the lock-up clutch when the throttle opening is high.

Subsequently, description will be made, referring to FIG. 9, of an example of running in the case in which the clutch C-1 is engaged in a slipping manner while keeping the lock-up clutch in the slip state, when the driver depresses the pedal to the high throttle opening TH at the vehicle start. In the same manner as described above with reference to FIG. 8, for example, in the state in which the vehicle stops with the foot brake depressed in the N range, the clutch C-1 is released, and also the lock-up clutch 7 is released. Therefore, the engine speed Ne in the idle state is transmitted through fluid by the torque converter 4, and the turbine speed Nt is slightly lower than the engine speed Ne.

In the same way, for example, when the driver operates the shift lever from the N range to the D range at time t1-2, the stopped-state lock-up control unit 25a of the lock-up control unit 25 determines to start the stopped-state lock-up control (S1-2), and, after the fast fill (play reduction operation) is performed, the lock-up clutch 7 is placed in a slightly engaged state so as to have the very small torque capacity TL-UP. In addition, because the foot brake is ON, the throttle opening TH is zero percent, and the vehicle speed V is zero, the neutral control unit 24a of the clutch control unit 24 determines to start the in-neutral control (S2-2), and, after the fast fill (play reduction operation) is performed, waits in the state immediately before engaging the clutch C-1, while keeping the clutch C-1 in the released state at the engagement pressure PC1 slightly lower than the stroke-end pressure at which the play reduction operation of the clutch C-1 is performed.

When the brake is detected to be turned OFF (Yes in S1-3) at time t2-2, it is determined that the driver intends to start the vehicle. Accordingly, the starting-state lock-up control unit 25b determines to start the starting-state lock-up control (S1-4), and the lock-up clutch 7 is placed in the engaged state in the slip region so as to have the predetermined torque capacity TL-UP1. At the same time, the starting-state lock-up control unit 25b determines the engagement state (ON, OFF, or slip state) of the lock-up clutch 7 by referring to the lock-up control map 25map shown in FIG. 10. First of all, from this time t2-2 to time t3-2, as indicated by an arrow A in FIG. 10, the engagement state in the slip region is selected, because the throttle opening TH is zero percent, and the vehicle speed V (output shaft speed Nout) is small.

On the other hand, when the brake is detected to be turned OFF (Yes in S2-3) at the time t2-2, it is determined that the driver intends to start the vehicle. Accordingly, the application control unit 24b of the clutch control unit 24 performs the fast-fill control (S2-4-2), and then, performs the above-described standby control (S2-4-4). Moreover, the slip start control unit 24c starts the slip start control (S2-4-6) so as to initiate the start of the vehicle (rise of the output shaft speed Nout) while slip-controlling the clutch C-1.

From this time t2-2 to the time t3-2, the lock-up clutch 7 is in the engaged state at the predetermined torque capacity TL-UP1 as described above, and the torque capacity TC1 of the clutch C-1 and the engine torque Te do not exceed the torque capacity TL-UP of the lock-up clutch 7. Therefore, the lock-up clutch 7 does not slip, and the engine speed Ne is the same as the turbine speed Nt; that is, the engine 2 is prevented from revving up.

Further, when the driver depresses the accelerator pedal by a large operation amount to rapidly increase the throttle opening TH at the time t3-2, the slip start control unit 24c calculates the torque capacity TC1 of the clutch C-1 by using a calculation method to be described later in detail, and controls the engagement pressure PC1 so as to achieve the torque capacity TC1 thus calculated. As a result, the engagement pressure PC1 and the torque capacity TC1 increase rapidly in response to the throttle opening TH.

In this case, as indicated by the arrow A in FIG. 10, even though the throttle opening TH increases, the state remains in the slip region in the lock-up control map 25map, and the engagement pressure PL-UP and the predetermined torque capacity TL-UP1 of the lock-up clutch 7 are maintained without change. However, because the torque capacity TC1 of the clutch C-1 and the engine torque Te exceed the torque capacity TL-UP of the lock-up clutch 7, that is, because the lock-up clutch 7 slips as the engine torque Te rises, the torque is transmitted through fluid by the torque converter 4. That is, as shown in FIG. 9, the engine speed Ne rises so as to exceed the turbine speed Nt.

In this fluid transmission by the torque converter 4, because the rotational speeds of the pump impeller 4a and the turbine runner 4b are small and differ from each other, the above-described torque amplifying function is generated via the stator 4c. Therefore, the engine torque Te is amplified and transmitted to the input shaft 10 of the automatic speed change mechanism 5, and the torque thus amplified is transmitted to the driving wheel (not shown) via the clutch C-1. Consequently, a larger output torque is obtained in response to an increase of the accelerator operation amount (throttle opening) by the driver, thereby ensuring driveability.

Then, the output shaft speed Nout also rises so as to progressively establish the gear ratio of the first forward speed (to advance the shifting progression ratio) as the engagement state of the clutch C-1 progresses. Then, when the gear ratio of the first forward speed is established at time t4-2, the clutch C-1 is determined to be completely engaged (Yes in S2-4-7 and Yes in S1-5), and accordingly, the application control of the clutch C-1 by the application control unit 24b ends (S2-5). On the other hand, the starting-state lock-up control (S1-4) by the starting-state lock-up control unit 25b ends, and the process shifts to the lock-up steady-state control (S1-6) performed by the steady-state lock-up control unit 25c. However, because the lock-up clutch 7 is in the slip region as indicated by the arrow A in the lock-up control map 25map shown in FIG. 10, the slip state is still maintained at the time t4-2, and thereafter, when the vehicle speed V has increased to exceed the determination line for the lock-up ON (Lup ON) as indicated by the arrow A, the steady-state lock-up control unit 25c determines to turn ON the lock-up clutch 7, whereby the engagement pressure PL-UP is swept up, and the lock-up clutch 7 is engaged (turned ON). In this way, the steady-state running state at the first forward speed with the lock-up ON is achieved.

[Example of Starting Running in Slip State to Released State of Lock-up Clutch at High Throttle Opening]

Figure 11:
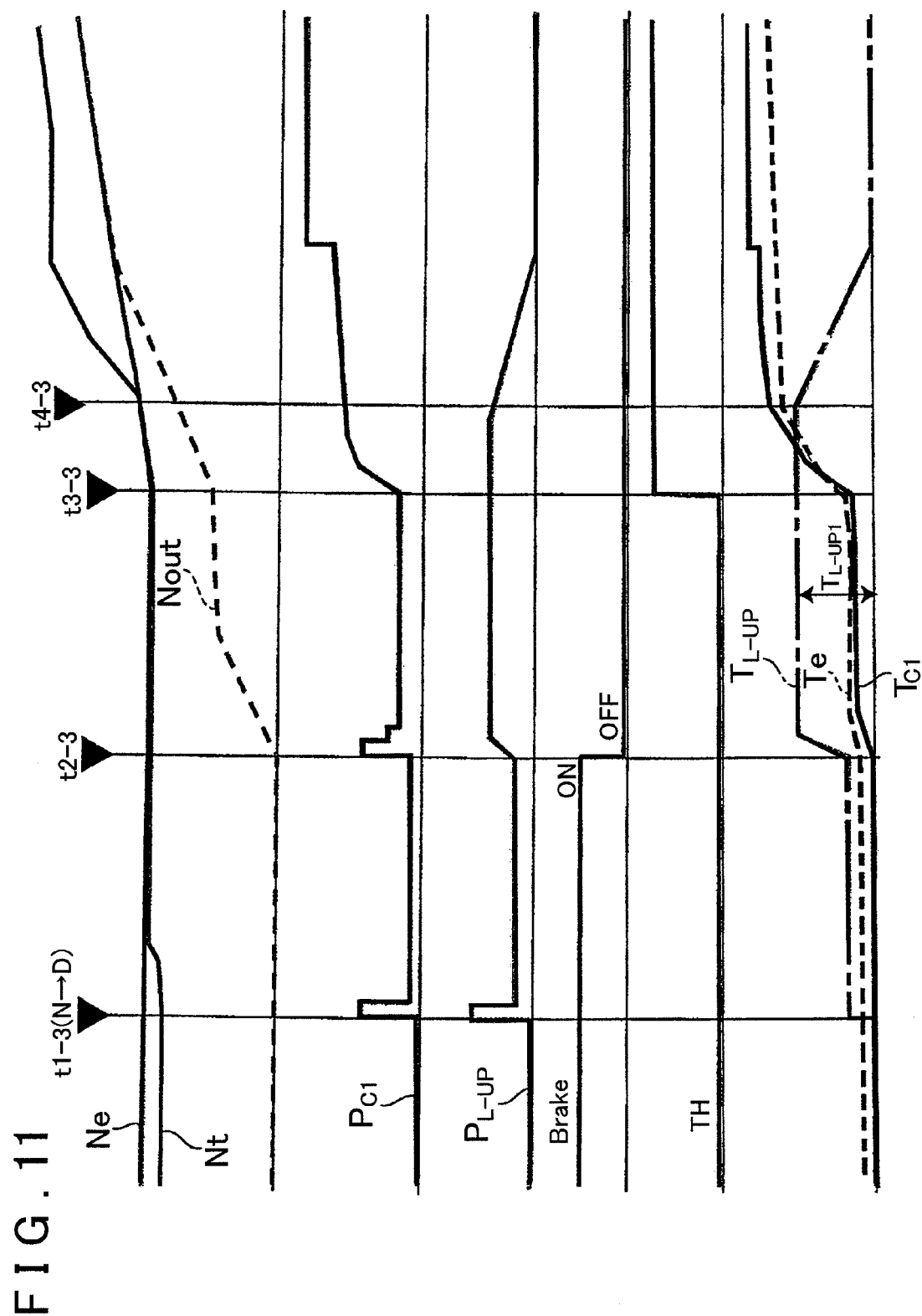
FIG. 11 is a timing chart showing a start in states changing from the slip state to a released state of the lock-up clutch when the throttle opening is high.

Subsequently, as another embodiment in the case in which the driver depresses the pedal to the high throttle opening TH at the vehicle start, description will be made, referring to FIG. 11, of an example of running in the case in which the vehicle is started by engaging the clutch C-1 in a slipping manner while shifting the lock-up clutch from the slip state to the released state, in the same manner as described with reference to FIG. 9. In the same manner as described above with reference to FIG. 9, for example, in the state in which the vehicle stops with the foot brake depressed in the N range, the clutch C-1 is released, and also the lock-up clutch 7 is released. Therefore, the engine speed Ne in the idle state is transmitted through fluid by the torque converter 4, and the turbine speed Nt is slightly lower than the engine speed Ne.

In the same way, for example, when the driver operates the shift lever from the N range to the D range at time t1-3, the stopped-state lock-up control unit 25a of the lock-up control unit 25 determines to start the stopped-state lock-up control (S1-2), and, after the fast fill (play reduction operation) is performed, the lock-up clutch 7 is placed in a slightly engaged state so as to have the very small torque capacity TL-UP. In addition, because the foot brake is ON, the throttle opening TH is zero percent, and the vehicle speed V is zero, the neutral control unit 24a of the clutch control unit 24 determines to start the in-neutral control (S2-2), and, after the fast fill (play reduction operation) is performed, waits in the state immediately before engaging the clutch C-1, while keeping the clutch C-1 in the released state at the engagement pressure PC1 slightly lower than the stroke-end pressure at which the play reduction operation of the clutch C-1 is performed.

When the brake is detected to be turned OFF (Yes in S1-3) at time t2-3, it is determined that the driver intends to start the vehicle. Accordingly, the starting-state lock-up control unit 25b determines to start the starting-state lock-up control (S1-4), and the lock-up clutch 7 is placed in the engaged state in the slip region so as to have the predetermined torque capacity TL-UP1. At the same time, the starting-state lock-up control unit 25b determines the engagement state (ON, OFF, or slip state) of the lock-up clutch 7 by referring to the lock-up control map 25map shown in FIG. 12. First of all, from this time t2-3 to time t3-3, as indicated by an arrow A in FIG. 12, the engagement state in the slip region is selected, because the throttle opening TH is zero percent, and the vehicle speed V (output shaft speed Nout) is small.

On the other hand, when the brake is detected to be turned OFF (Yes in S2-3) at the time t2-3, it is determined that the driver intends to start the vehicle. Accordingly, the application control unit 24b of the clutch control unit 24 performs the fast-fill control (S2-4-2), and then, performs the above-described standby control (S2-4-4). Moreover, the slip start control unit 24c starts the slip start control (S2-4-6) so as to initiate the start of the vehicle (rise of the output shaft speed Nout) while slip-controlling the clutch C-1.

From this time t2-3 to the time t3-3, the lock-up clutch 7 is in the engaged state at the predetermined torque capacity TL-UP1 as described above, and the torque capacity TC1 of the clutch C-1 and the engine torque Te do not exceed the torque capacity TL-UP of the lock-up clutch 7. Therefore, the lock-up clutch 7 does not slip, and the engine speed Ne is thereby the same as the turbine speed Nt; that is, the engine 2 is prevented from revving up.

Further, when the driver depresses the accelerator pedal by a large operation amount to rapidly increase the throttle opening TH at the time t3-3, the slip start control unit 24c calculates the torque capacity TC1 of the clutch C-1 by using a calculation method to be described later in detail, and controls the engagement pressure PC1 so as to achieve the torque capacity TC1 thus calculated. As a result, the engagement pressure PC1 and the torque capacity TC1 increase rapidly in response to the throttle opening TH.

Figure 12:
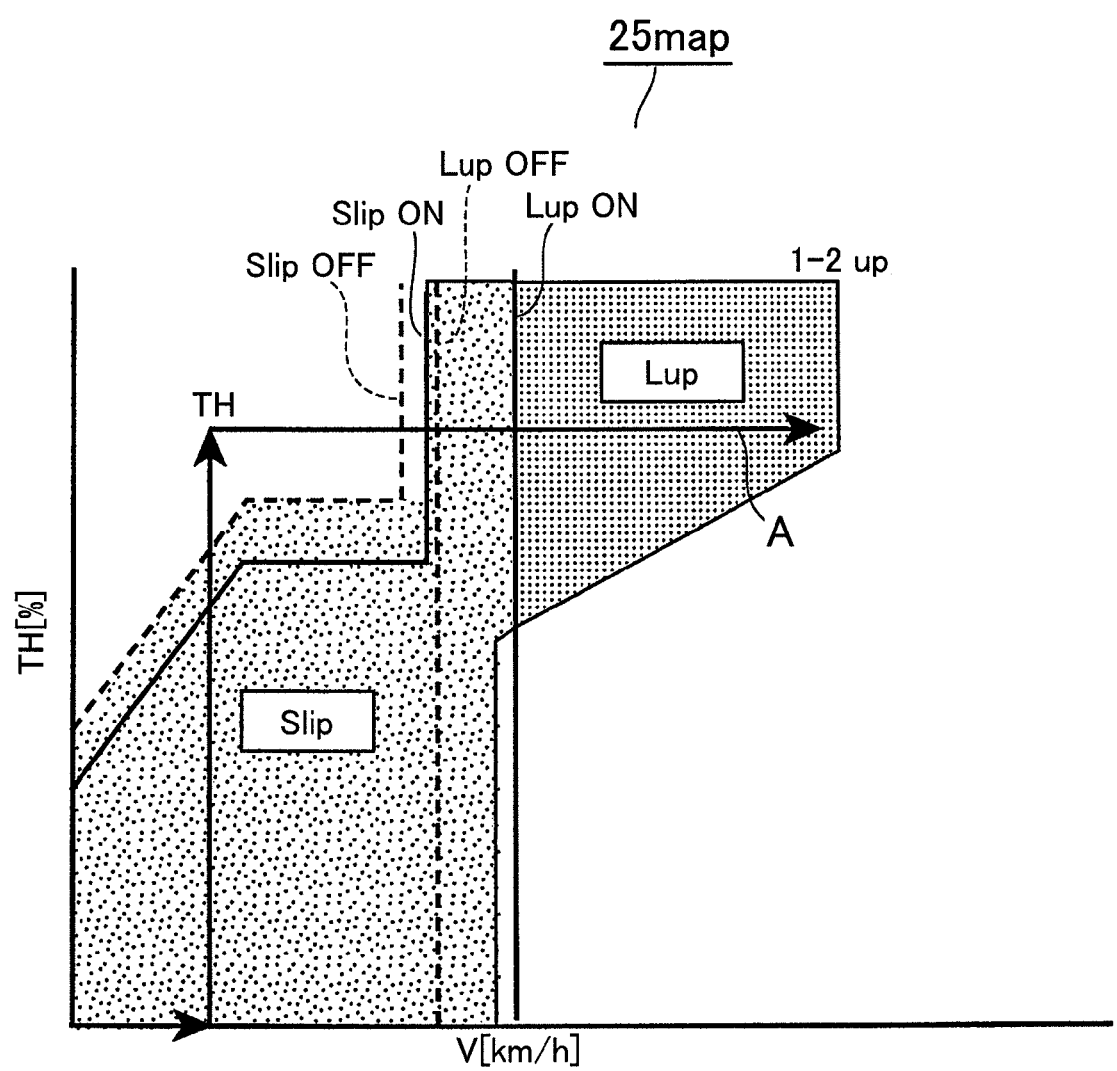
FIG. 12 is a diagram showing the lock-up control map for controlling the lock-up clutch by switching between the slip region and the released region at the start.

In this case, as indicated by the arrow A in FIG. 12, when the throttle opening TH increases, the state is switched from the slip region to the lock-up OFF region in the lock-up control map 25map. Therefore, at time t4-3, the starting-state lock-up control unit 25b starts to sweep down the engagement pressure PL-UP of the lock-up clutch 7, and accordingly, the torque capacity TL-UP of the lock-up clutch 7 gradually drops. Then, the lock-up clutch 7 is released. As a result, the torque transmission of the lock-up clutch 7 is lost due to the release thereof; the torque is now transmitted through the fluid transmission by the torque converter 4; and, the engine torque Te is amplified and transmitted to the input shaft 10 of the automatic speed change mechanism 5 with the lock-up clutch 7 not interfering with the torque amplifying function of the torque converter 4. Thus, a still larger output torque than in the case of FIG. 9 is obtained in response to an increase in the accelerator operation amount (throttle opening) by the driver, thereby ensuring the driveability. That is, as shown in FIG. 11, the engine speed Ne rises so as to exceed the turbine speed Nt by a large amount.

Thereafter, the output shaft speed Nout also rises so as to progressively establish the gear ratio of the first forward speed (to advance the shifting progression ratio) as the engagement state of the clutch C-1 progresses. Then, when the gear ratio of the first forward speed is established, the clutch C-1 is determined to be completely engaged (Yes in S2-4-7 and Yes in S1-5), and accordingly, the application control of the clutch C-1 by the application control unit $24b$ ends (S2-5). On the other hand, the starting-state lock-up control (S1-4) by the starting-state lock-up control unit $25b$ ends, and the process shifts to the lock-up steady-state control (S1-6) performed by the steady-state lock-up control unit $25c$. However, the lock-up clutch 7 is maintained to be in the released state until the state shifts from the lock-up OFF region to the slip region, as indicated by the arrow A in the lock-up control map 25map shown in FIG. 12.

Then, when the vehicle speed V has increased to exceed a determination line for a lock-up slip ON (Slip ON) as indicated by the arrow A, the steady-state lock-up control unit $25c$ determines to slip the lock-up clutch 7, and further, when the vehicle speed V exceeds a determination line for the lock-up ON (Lup ON), the steady-state lock-up control unit $25c$ determines to turn ON the lock-up clutch 7, thus engaging (turning ON) the lock-up clutch 7. The steady-state running state at the first forward speed with the lock-up ON is thereby achieved.

It should be noted that, in the lock-up control map 25map shown in FIG. 12, if the steady-state lock-up control unit $25c$ has started the lock-up steady-state control, the lock-up clutch 7 is determined to be engaged when the determination line drawn by a solid line in the drawing for the lock-up ON (Lup ON) is crossed rightward in the drawing, whereas the lock-up clutch 7 is determined to be released when a determination line drawn by a dotted line in the drawing for a lock-up OFF (Lup OFF) is crossed leftward in the drawing; in addition, the lock-up clutch 7 is determined to be slipped when the determination line drawn by a solid line in the drawing for the lock-up slip ON (Slip ON) is crossed rightward in the drawing, whereas the lock-up clutch 7 is determined to be released when a determination line drawn by a dotted line in the drawing for a lock-up slip OFF (Slip OFF) is crossed leftward in the drawing.

[Outline of Slip Start Control]

Subsequently, an outline of the slip start control of the clutch C-1 performed by the slip start control unit $24c$ will be described with reference to FIGS. 13 and 14. This slip start control performs control so as to prevent the rotational speed of the input shaft 10 of the automatic speed change mechanism 5 (that is, the turbine speed Nt) from dropping, when starting the vehicle by engaging the clutch C-1 while slipping the clutch C-1. Note that the period from time ta to time td shown in FIGS. 13 and 14, and in FIGS. 15 to 17 to be described later corresponds, for example, to the period from the time t2-1 to the time t4-1 shown in FIG. 8. Note also that FIG. 13 shows an example of running in the case in which the throttle opening TH is kept at zero percent, and FIG. 14 shows an example of running in the case in which the throttle opening TH is increased by depressing the accelerator pedal.

In this slip start control, the turbine speed Nt does not drop when the clutch C-1 is engaged while being slipped in the state of engaging the lock-up clutch 7 in the slip region as described above. Therefore, this control is preferably used. However, even in the case of shifting the clutch C-1 from the general neutral control to the engaged state, that is, even in the case of returning from the neutral control to the first forward speed in the released state of the lock-up clutch 7, occurrence of the inertial shock can be suppressed by using this control. Therefore, description will be made of an example case of shifting the clutch C-1 from the general neutral control to the engaged state.

Figure 13:
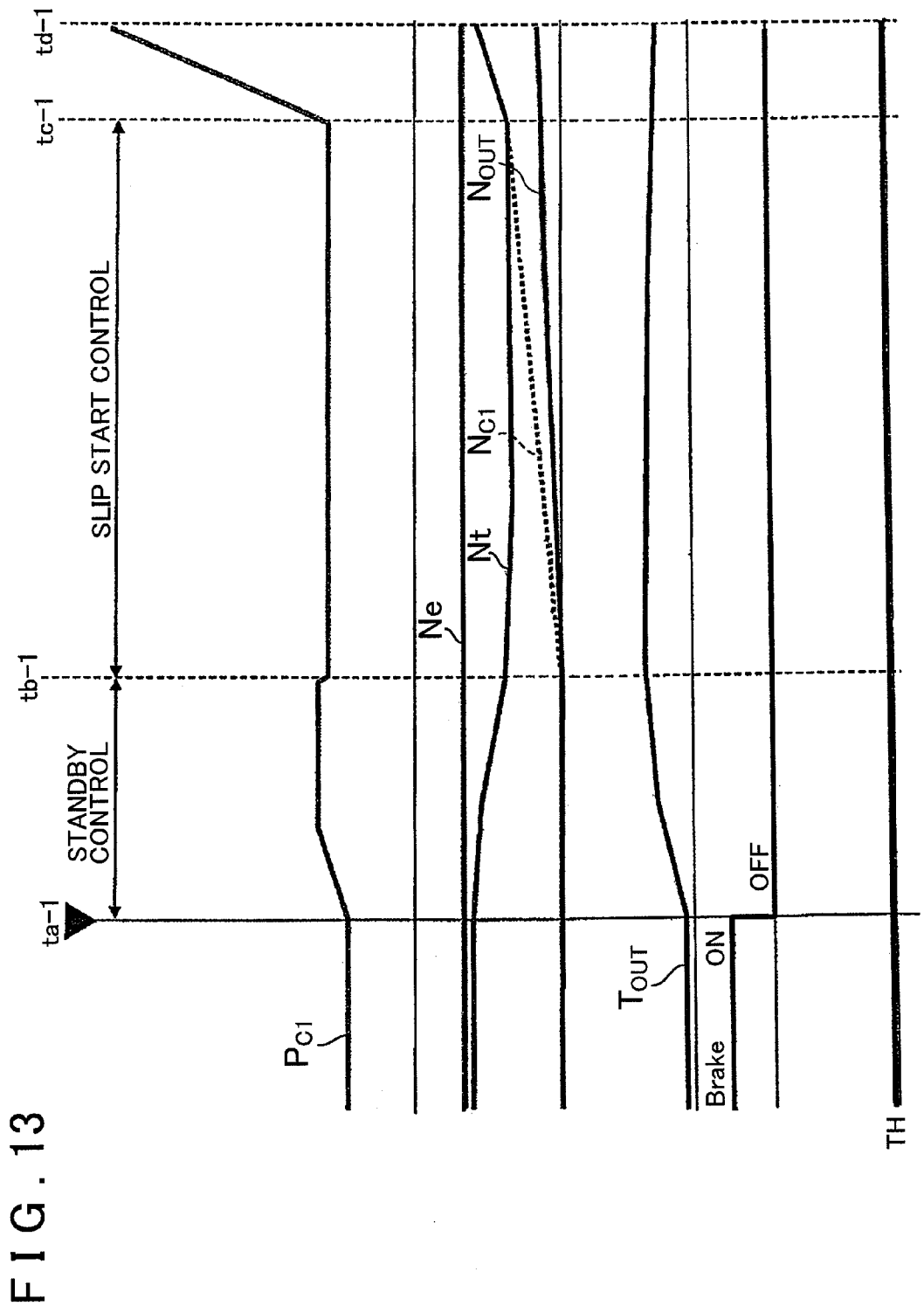
FIG. 13 is a timing chart showing slip start control when the throttle opening is low.
Figure 14:
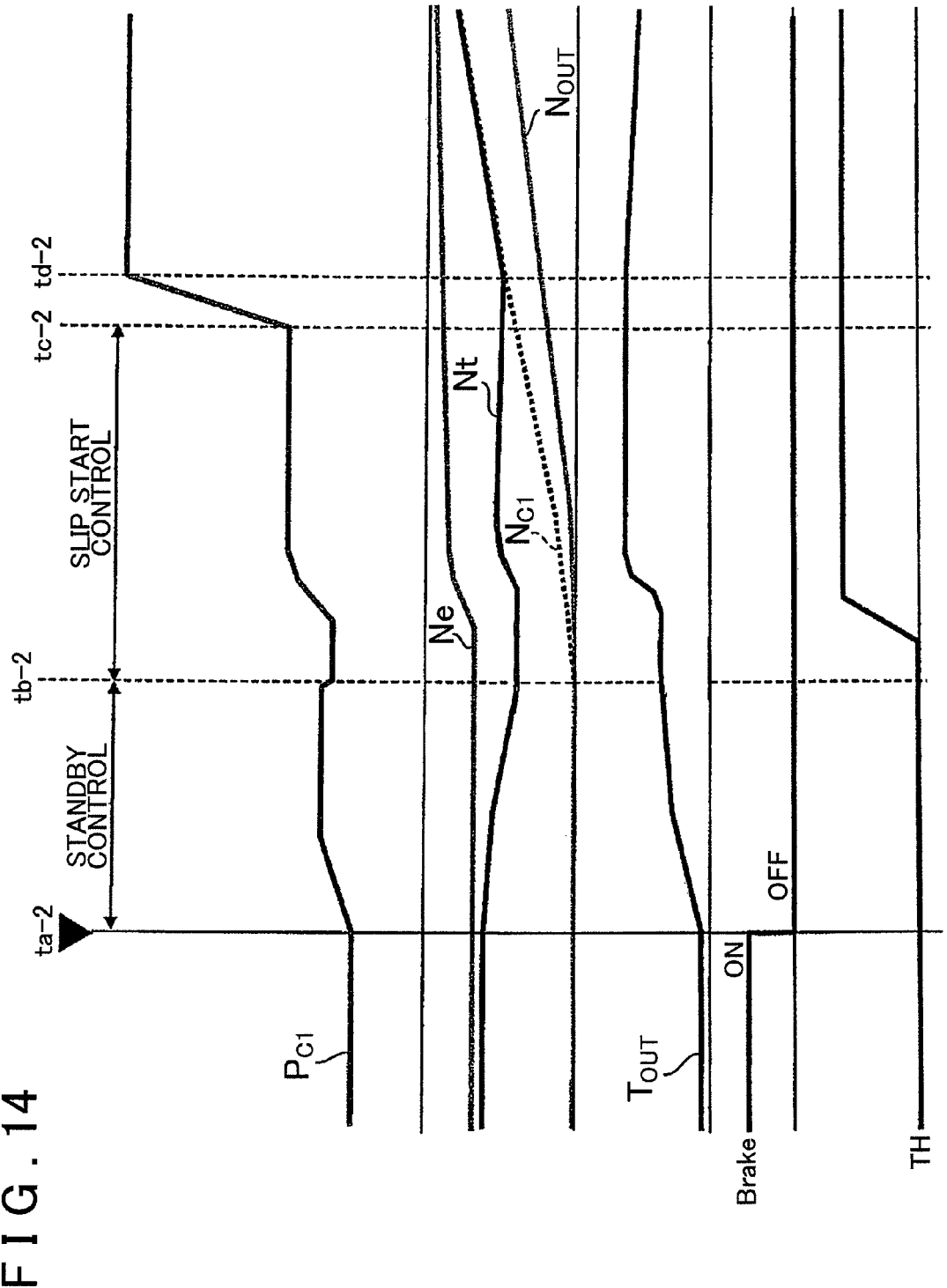
FIG. 14 is a timing chart showing the slip start control when the throttle opening is high.

As shown in FIG. 13, when the start intended operation detecting unit 23 detects the brake to be turned OFF (Yes in S2-3) at time ta-1, for example, while the in-neutral control (S2-2) is performed, the standby control (S2-4-4) is performed in which the engagement pressure PC1 of the clutch C-1 is controlled to the predetermined standby pressure, and, in the clutch C-1, the piston is gradually advanced from the position for the dragged state toward the engaged side. Thereby, the clutch C-1 starts to transmit the torque, and the turbine speed Nt slightly drops (if the lock-up clutch 7 is engaged, the engine speed Ne also slightly drops as the turbine speed Nt drops). Thus, the output torque Tout at the driving wheel (not shown) rises.

Because the example of running shown in FIG. 13 is a case of the general neutral control in which the engagement pressure PC1 of the clutch C-1 is maintained at the stroke-end pressure in the in-neutral control, the play of the clutch C-1 has been reduced in the neutral control. Therefore, the fast-fill control need not be performed. On the contrary, if, for example, as described above, the engagement pressure PC1 of the clutch C-1 is controlled to the pressure lower than the stroke-end pressure during the neutral control in order to improve the fuel consumption of the vehicle, the fast-fill control (S2-4-2) must be performed as described above.

When it is determined that the clutch C-1 has started to be engaged, for example, based on a change occurring in the turbine speed Nt (Yes in S2-4-5), the standby control is terminated at time tb-1, and the process shifts to the slip start control performed by the slip start control unit $24c$ (S2-4-6). In this slip start control, the slip start control unit $24c$ calculates the engagement pressure PC1 of the clutch C-1 with a method such as the three calculation methods to be described later, and performs hydraulic control so as to prevent the turbine speed Nt from dropping. As a result, without reducing the turbine speed Nt, the engagement of the clutch C-1 progresses, and an output-side speed NC1 of the clutch C-1 gradually increases; that is, the shifting progression ratio advances, and the gear ratio of the first forward speed is gradually established. Thus, the output shaft speed Nout also rises.

That is, conventionally, when calculating the hydraulic pressure command value for the engagement pressure PC1 of the clutch C-1, a commonly used calculation method has been such that the greatest value of the following values is selected as the hydraulic pressure command value: a basic gradient, a rotation ensuring gradient for ensuring a certain amount or more of rotation change, and a torque ensuring gradient for ensuring a certain amount or more of torque transmission. Accordingly, when the engagement of the clutch C-1 progresses, the turbine speed Nt comes close to the output shaft speed Nout that is stationary in accordance with the stopped state of the vehicle, and, as a result, rises after temporarily dropping by a large amount. During this drop in the turbine speed Nt, the inertial torque of the automatic speed change mechanism 5 is produced and added to the output torque. Therefore, a phenomenon used to occur in which the output torque temporarily increases and then drops again; that is, a shake-back shock used to occur. However, by engaging the clutch C-1 in a slipping manner so as not to reduce the turbine speed Nt as in this slip start control, the shake-back shock by the inertial torque is prevented from occurring.

Then, when the engagement of the clutch C-1 is determined to be completed at time tc-1 based on the information that the gear ratio calculated from the turbine speed Nt and the output shaft speed Nout has reached the gear ratio of the first forward speed (Yes in S2-4-7), the slip start control unit $24c$ issues the command to the linear solenoid valve SLC1 to raise the engagement pressure PC1 of the clutch C-1 at the predetermined gradient to the pressure equivalent to the line pressure PL by time td-1, and finishes the engagement of the clutch C-1. Then, the slip start control is terminated (S2-4-11 and S2-5).

As shown in FIG. 14, for example, during the in-neutral control, if it is determined that engagement of the clutch C1 is started after the brake is detected to be turned OFF at time ta-2, and then the standby control of the clutch C-1 is performed, the standby control is terminated at time tb-2, and the process shifts to the slip start control performed by the slip start control unit 24c. Thereafter, even if the throttle opening TH increases, for example, due to depression of the accelerator pedal by the driver, the engagement pressure PC1 of the clutch C-1 is calculated with a method such as the three calculation methods to be described later, and hydraulically controlled so as to prevent the turbine speed Nt from dropping and the gear ratio (shifting progression ratio) from retrogressing. As a result, without reducing the turbine speed Nt, the engagement of the clutch C-1 progresses corresponding to the magnitude of the throttle opening TH, thereby increasing the output-side speed NC1 of the clutch C-1 in accordance with the increase in the throttle opening TH. The shifting progression ratio thereafter advances so as to gradually establish the gear ratio of the first forward speed.

Then, in the same way, when the engagement of the clutch C-1 is determined to be completed at time tc-2 based on the information that the gear ratio calculated from the turbine speed Nt and the output shaft speed Nout reaches the gear ratio of the first forward speed, the slip start control unit 24c issues the command to the linear solenoid valve SLC1 to raise the engagement pressure PC1 of the clutch C-1 at the predetermined gradient to the pressure equivalent to the line pressure PL by time td-2, and finishes the engagement of the clutch C-1. Then, the slip start control is terminated.

As described above, because the turbine speed Nt does not drop in the slip start control of the clutch C-1, the vehicle can be started without an occurrence of fluctuation in the inertial force, and thus, without causing the shake-back shock, when engaging the clutch C-1 from the neutral state of the automatic speed change mechanism 5, thereby making it possible to improve ride comfort.

[Calculation Method of Calculating Engagement Pressure PC1 by Calculating Inertial Torque]

Subsequently, description will be made, referring to FIG. 15, of a calculation method of calculating the engagement pressure PC1 from the inertial torque produced in the automatic speed change mechanism 5 in the slip start control performed by the slip start control unit 24c.

Figure 15:
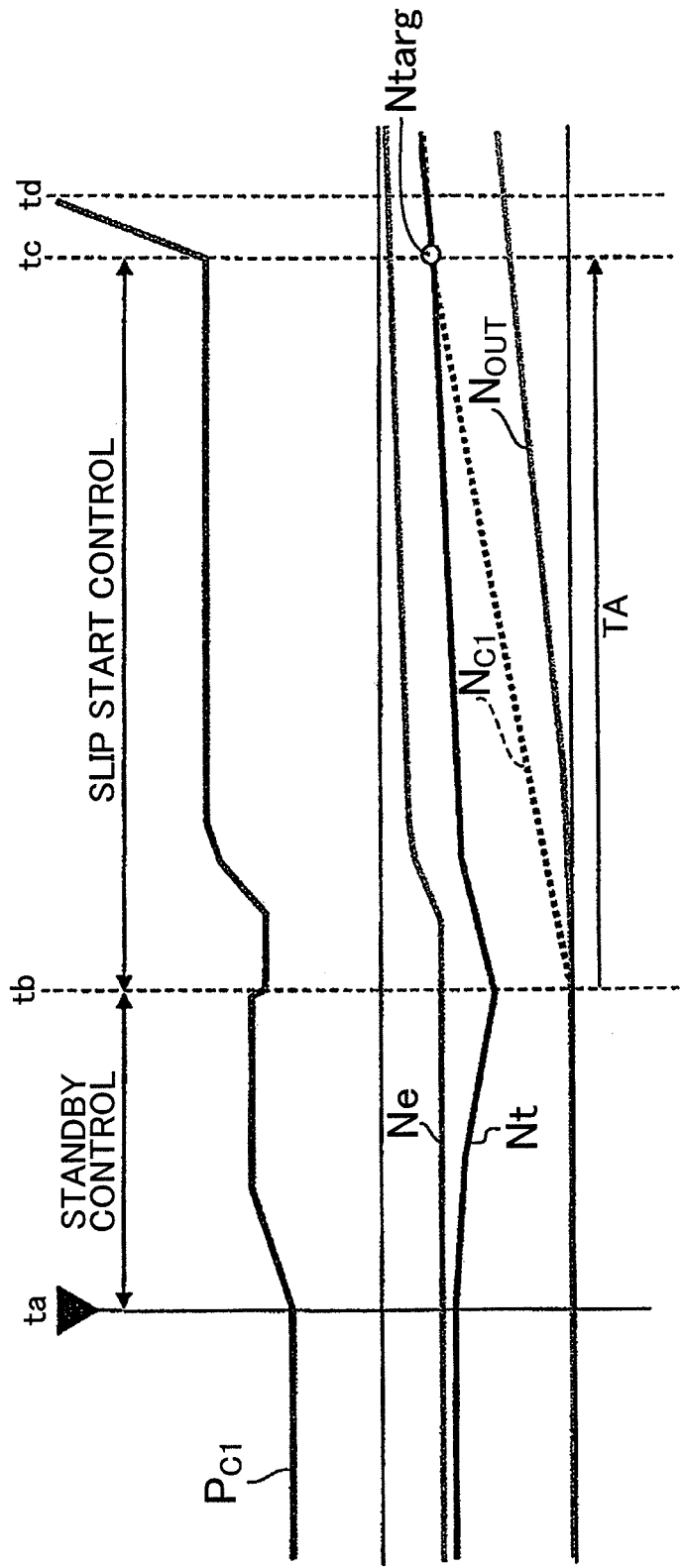
FIG. 15 is a timing chart showing the slip start control that calculates a torque capacity of the clutch C-1 taking into account an inertial torque.

First of all, as shown in FIG. 15, the slip start control unit 24c sets the target termination time TA, and then, sets the target turbine speed Ntarg at the target termination time TA, for example, by taking into account the current value of the throttle opening TH. Here, an inertial component "I" in the automatic speed change mechanism 5 is a sum of a torque converter secondary-side inertia "TC_intertia2" from the turbine runner 4b of the torque converter 4 to the input shaft 10 of the automatic speed change mechanism 5 and an input-side inertia "GR_intertia" from the input shaft 10 to the input-side member of the clutch C-1. Therefore, the inertial component I is given as follows.

$$I = TC\_intertia2 + GR\_intertia \quad (1)$$

By denoting the first speed gear ratio as "G1ST" and an elapsed time from the start of the slip start control as "cnt_C1Slip", a rotation change amount "ω" of the output shaft speed Nout for reaching the target turbine speed Ntarg by the target termination time TA is given as follows.

$$\omega = (Ntarg - Nout \times G1ST)/(TA - cnt\_C1Slip) \quad (2)$$

Figure 7:
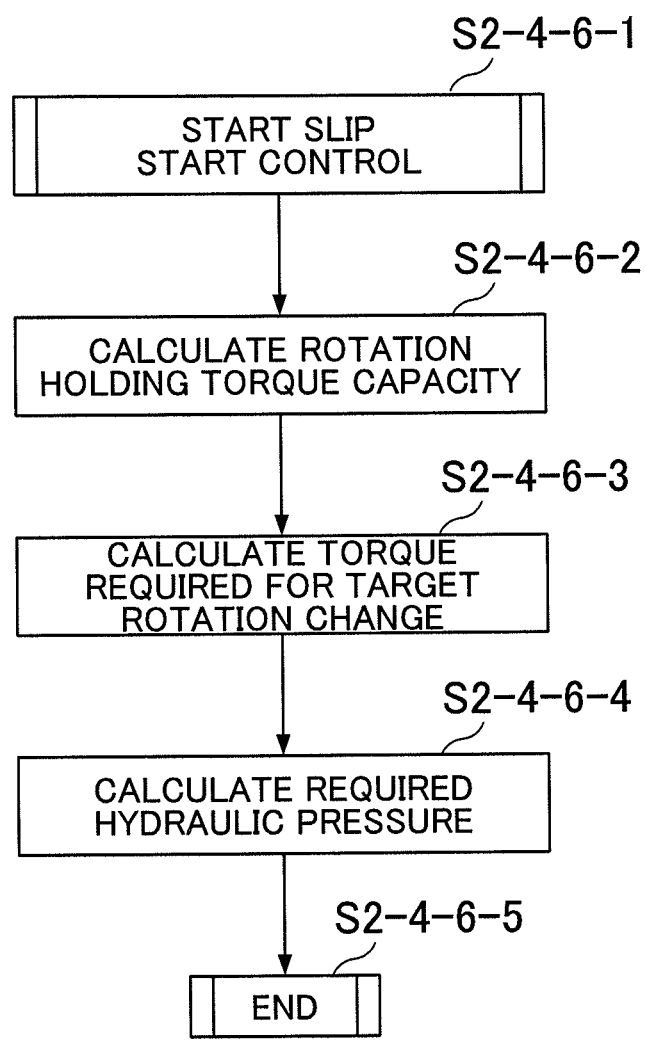
FIG. 7 is a flow chart showing an example of slip start control of the clutch C-1.

Moreover, by denoting a current speed ratio (speed ratio between the pump impeller 4a and the turbine runner 4b) in the torque converter 4 as "ecurrent", a capacity coefficient of the torque converter 4 at the current speed ratio as "C(ecurrent)", a torque ratio of the torque converter 4 at the current speed ratio as "t(ecurrent)", the torque transmitted by the lock-up clutch 7 as "TL-UP", a torque distribution to the clutch C-1 as "TdivC1" and the engine speed as "Ne", a torque capacity "TC1-CONT" for holding the rotational speed NC1 of an output-side member of the clutch C-1 at a constant value is calculated as follows (S2-4-6-2 in FIG. 7).

$$TC1\text{-}CONT = (C(ecurrent) \times Ne2 \times t(ecurrent) + TL\text{-}UP) \times (TdivC1) \quad (3)$$

A torque capacity "TC1-change" required as a component for achieving the target rotation change at the rotational speed NC1 of the output-side member of the clutch C-1 is calculated as follows (S2-4-6-3 in FIG. 7).

$$TC1\text{-}change = (I\omega) \times (TdivC1) \quad (4)$$

Thus, the torque capacity required for achieving the target rotation change at the rotational speed NC1 of the output-side member of the clutch C-1 is given as follows.

$$TC1 = TC1\text{-}CONT + TC1\text{-}change = (C(ecurrent) \times Ne2 \times t(ecurrent) + TL\text{-}UP + I\omega) \times (TdivC1) \quad (5)$$

In other words, the above calculation formula (5) calculates, in effect, the torque capacity TC1 of the clutch C-1 based on the total torque obtained by adding the produced inertial torque (Iω) to the input torque (t·C·Ne2+TL-UP) from the engine 2.

Then, by calculating the hydraulic pressure command value for the engagement pressure PC1 so as to obtain the torque capacity of the clutch C-1 required for achieving the above-described target rotation change, and by hydraulically controlling the linear solenoid valve SLC1 based on the hydraulic pressure command value, the turbine speed Nt is controlled so as to reach the target turbine speed Ntarg at the target termination time TA as shown in FIG. 15; that is, the clutch C-1 is slip-controlled so as to establish the gear ratio of the first forward speed at the target termination time TA. As a result, because the turbine speed Nt does not drop, and no fluctuation occurs in the inertial force when engaging the clutch C-1 in the slip start control of the clutch C-1, the vehicle can be started without an occurrence of the shake-back shock, thereby making it possible to improve the ride comfort. In addition, with this calculation method shown in FIG. 15, because the engagement pressure can be hydraulically controlled while calculating the inertial torque, the fluctuation in the inertial force can be set freely.

[Calculation Method of Calculating Engagement Pressure PC1 so that Speed Ratio Between Turbine Speed and Engine Speed Is Constant]

Next, description will be made, referring to FIG. 16, of a calculation method of calculating the engagement pressure PC1 so that the speed ratio between the turbine speed Nt and the engine speed Ne is constant in the slip start control by the slip start control unit 24c.

Figure 16:
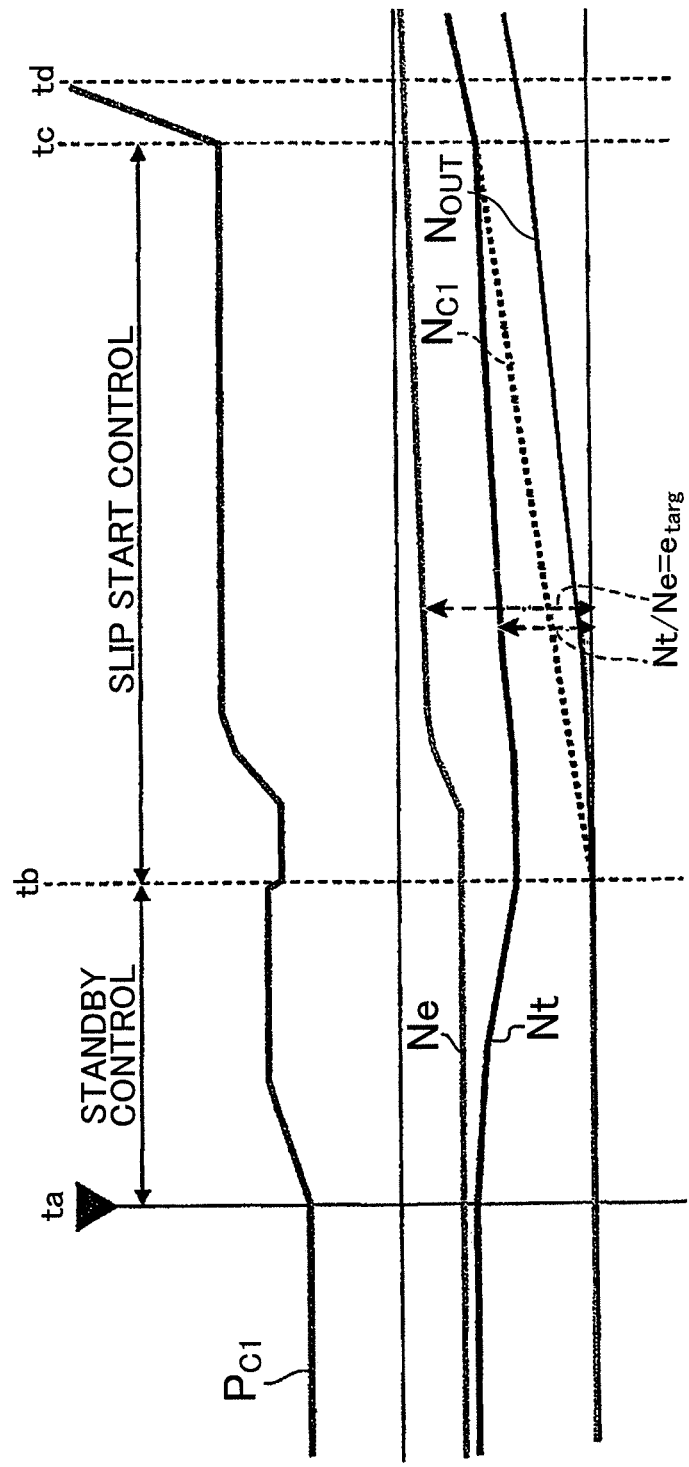
FIG. 16 is a timing chart showing the slip start control that calculates the torque capacity of the clutch C-1 so that a target speed ratio is constant.

In the calculation method shown in FIG. 16, the slip start control unit 24c sets a target speed ratio "Nt/Ne=etarg" between the turbine speed Nt and the engine speed Ne to a constant value, and calculates the torque capacity TC1 of the clutch C-1 based on the constant target speed ratio etarg. That is, the torque capacity TC1 for achieving the constant target speed ratio etarg is given as follows.

$$TC1 = (C(\text{etarg}) \times Ne2 \times t(\text{etarg})) \times (TdivC1) \quad (6)$$

Then, by calculating the hydraulic pressure command value for the engagement pressure PC1 so as to obtain the torque capacity of the clutch C-1 for achieving the above-described constant target speed ratio, and by hydraulically controlling the linear solenoid valve SLC1 based on the hydraulic pressure command value, control is performed so as to keep the target speed ratio etarg constant as shown in FIG. 16; that is, the clutch C-1 is slip-controlled so as to establish the gear ratio of the first forward speed as time passes, without reducing the turbine speed Nt calculated based on the constant ratio, unless the engine speed Ne drops below the idle speed. As a result, because the turbine speed Nt does not drop, and thus, no fluctuation occurs in the inertial force when engaging the clutch C-1 in the slip start control of the clutch C-1, the vehicle can be started without an occurrence of the shake-back shock, thereby making it possible to improve the ride comfort.

In addition, with this calculation method shown in FIG. 16, because the target speed ratio etarg between the turbine speed Nt and the engine speed Ne is constant, a constant amount of the torque amplifying function can be obtained by the torque converter 4. Therefore, an input torque proportional to an output change (output rise) of the engine 2 can be obtained; that is, an acceleration feeling proportional to the output torque required by the driver (that is, the throttle opening TH) can be obtained.

[Calculation Method of Calculating Engagement Pressure PC1 by Calculating Target Constant Turbine Speed]

Next, description will be made, referring to FIG. 17, of a calculation method of calculating the engagement pressure PC1 by calculating a target constant turbine speed Nttarg as a constant value in the slip start control by the slip start control unit 24c.

Figure 17:
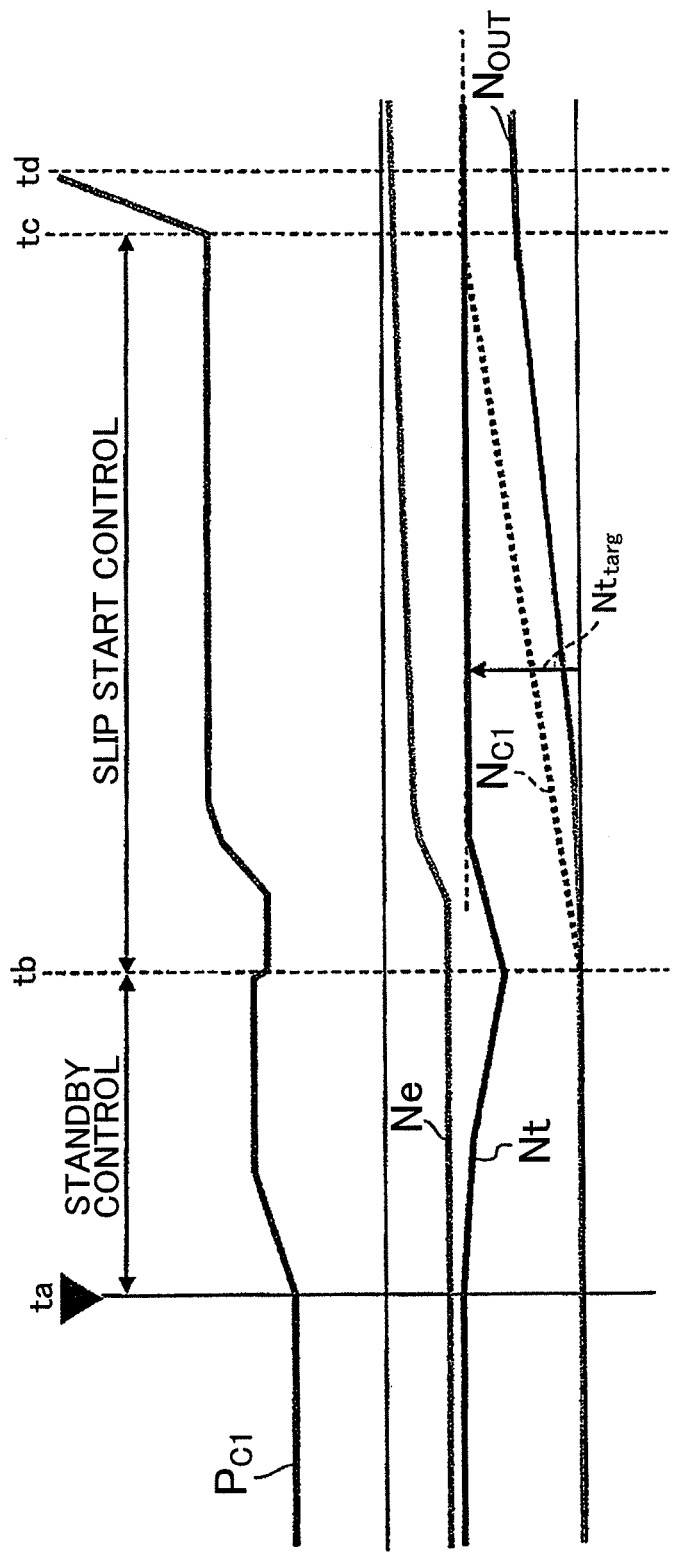
FIG. 17 is a timing chart showing the slip start control that calculates the torque capacity of the clutch C-1 so that a target input rotational speed is constant.

In the calculation method shown in FIG. 17, the slip start control unit 24c sets the target constant turbine speed Nttarg to a constant value. Then, the target speed ratio etarg is calculated from the target constant turbine speed Nttarg and the engine speed Ne as follows.

$$\text{etarg} = Nttarg/Ne$$

That is, the target speed ratio etarg is calculated so that the turbine speed Nt stays constant even if the engine speed Ne changes. Then, in the same manner as in the above formula (6), the torque capacity TC1 to achieve the target speed ratio etarg is given as follows.

$$TC1 = (C(\text{etarg}) \times Ne2 \times t(\text{etarg})) \times (TdivC1) \quad (6)'$$

Because the target speed ratio etarg changes corresponding to the change in the engine speed Ne, the torque capacity TC1 is calculated so that the turbine speed Nt results to be constant.

Then, by calculating the hydraulic pressure command value for the engagement pressure PC1 so as to obtain the torque capacity of the clutch C-1 for achieving the above-described target speed ratio, and by hydraulically controlling the linear solenoid valve SLC1 based on the hydraulic pressure command value, control is performed so as to keep the target turbine speed Ntarg constant as shown in FIG. 17; that is, the clutch C-1 is slip-controlled so as to establish the gear ratio of the first forward speed as time passes, without reducing the turbine speed Nt. As a result, because the turbine speed Nt does not drop, and no fluctuation occurs in the inertial force when engaging the clutch C-1 in the slip start control of the clutch C-1, the vehicle can be started without an occurrence of the shake-back shock, thereby making it possible to improve the ride comfort.

In addition, with this calculation method shown in FIG. 17, although the output torque Tout to the driving wheel fluctuates due to the change in the engine speed Ne particularly because the turbine speed Nt is constant, the occurrence of the inertial force in the automatic speed change mechanism 5 can be eliminated almost completely.

[Summary of the Present Invention]

As described above, according to the control apparatus 1 of an automatic transmission, the clutch control unit 24 controls the clutch C-1 so as to be disengaged to control the automatic speed change mechanism 5 to be in neutral in the state in which the shift range is determined to be the D range and the vehicle is determined to be stopped, and performs the engagement control of the clutch C-1 to start the vehicle by the slip start control when the operation intended for starting the vehicle is detected. On the other hand, the lock-up control unit (lock-up clutch control unit) 25 controls the lock-up clutch 7 to be engaged in the state in which the shift range is determined to be the D range and the vehicle is determined to be stopped (that is, during the neutral control), and controls the lock-up clutch 7 so that the lock-up clutch 7 is at least engaged in the slip region in which the predetermined torque capacity TL-UP1 is obtained, when the operation intended for starting the vehicle is detected. That is, the lock-up clutch 7 is engaged before the start of the vehicle. Therefore, the lock-up clutch 7 can be promptly engaged in the slip region even immediately after the start (delay in the engagement of the lock-up clutch 7 can be prevented). Thus, revving up of the engine speed Ne immediately after the start can be prevented, whereby, the fuel consumption of the vehicle can be improved. In addition, while the engine speed Ne is low, the output torque required by the driver is small and the lock-up clutch 7 receives a smaller torque than the predetermined torque capacity TL-UP. Therefore, the lock-up clutch 7 is stably held in the engaged state, thereby making it possible to start the vehicle without an occurrence of the shake-back shock and to improve the ride comfort.

In addition, if the engine torque Te and the torque capacity TC1 of the clutch C-1 are larger than the predetermined torque capacity TL-UP of the lock-up clutch 7, the vehicle is started by using the torque amplifying function of the torque converter 4 while slipping the lock-up clutch 7. Therefore, for example, if the required torque required by the driver is small, the lock-up clutch 7 does not slip as described above, thus making it possible to prevent the revving up of the engine speed Ne, and to improve the fuel consumption of the vehicle. In addition, for example, if the required torque required by the driver is large, a large amount of the output torque Tout can be obtained, thereby making it possible to ensure the driveability.

Moreover, if the engine torque Te and the torque capacity TC1 of the clutch C-1 are larger than the predetermined torque capacity TL-UP of the lock-up clutch 7, the vehicle can also be started by using the torque amplifying function of the torque converter 4 by spontaneously releasing the lock-up clutch 7 by the lock-up control unit 25. Similarly, for example, if the required torque required by the driver is small, the lock-up clutch 7 does not slip as described above, thus making it possible to prevent the revving up of the engine speed Ne, and to improve the fuel consumption of the vehicle. In addition, for example, if the required torque required by the driver is large, a larger amount of the output torque Tout can be obtained than in the case of dragging the lock-up clutch 7, thereby making it possible to ensure the driveability. That is, because the lock-up clutch 7 is released without being slipped when starting the vehicle by using the torque amplifying function of the torque converter 4, the drag by the lock-up clutch 7 can be eliminated, whereby a larger amount of the torque amplifying function can be obtained.

Furthermore, because the lock-up control unit 25 controls the release, the slip, and the engagement of the lock-up clutch 7 by referring to the lock-up control map 25map based on the throttle opening TH (that is, the required output) and the vehicle speed V, the engagement state of the lock-up clutch 7 can be controlled without conducting complicated calculations. As shown in FIG. 12, by making the release region of the lock-up clutch 7 correspond to the state in which the engine torque Te and the torque capacity TC1 of the clutch C-1 are larger than the predetermined torque capacity TL-UP of the lock-up clutch 7, the vehicle can be started by using the torque amplifying function of the torque converter 4 in the released state of the lock-up clutch 7.

In the present embodiment described above, description has been made of the cases where the control apparatus 1 is applied to the automatic transmission 3 that can achieve, for example, sixth forward speeds and a reverse speed. However, the present invention is not limited to these cases, but can be applied to any automatic transmission, such as a multi-stage automatic transmission, a belt-type continuously variable transmission, or a toroidal continuously variable transmission, that performs the neutral control and then the slip start control of a clutch that is engaged to transmit power at the vehicle start, and that has a lock-up clutch.

In the present embodiment, description has been made of the "start control by engaging the clutch C-1 in a slipping manner in the engaged state of the lock-up clutch." However, such control may be performed in situations selected, for example, depending on road conditions and running environment. In other words, a structure can be considered in which this start control is stopped and normal start control (control to engage the clutch C-1 while keeping the lock-up clutch in the released state) is selected when a condition, such as an uphill slope, a downhill slope, a sport mode, a high or low oil temperature, or running in a traffic congestion, is determined.

Moreover, in the present embodiment, description has been made of the cases where the engagement pressure PC1 of the clutch C-1 is controlled to the pressure lower than the stroke-end pressure during the neutral control. However, as a matter of course, the present invention can also be applied to the general neutral control (that is, controlling the engagement pressure PC1 to the vicinity of the stroke-end pressure).

Furthermore, in the present embodiment, although description of a detailed structure of the lock-up clutch 7 has been omitted, the present invention can be applied to lock-up clutches of any structure, such as a single-plate type lock-up clutch, a multi-plate type lock-up clutch, and a so-called two-way type or three-way type lock-up clutch, as a matter of course.

In addition, as a lock-up clutch, if the lock-up clutch locks up the torque converter, the torque amplifying function of the torque converter can particularly be obtained by slipping the lock-up clutch. However, it is obvious that, even with a fluid transmission apparatus, such as a fluid coupling, that cannot provide the torque amplifying function, the revving up of the driving source can be prevented by applying the control of the present invention.

The hydraulic control device for a starting device according to the present invention can be used as a control apparatus of an automatic transmission mounted, for example, in a passenger vehicle or a truck, and can particularly preferably be used for a control apparatus of an automatic transmission that starts the vehicle by engaging a clutch of an automatic speed change mechanism after neutral control is performed using the clutch, and that performs slip control of a lock-up clutch so as to prevent a driving source from revving up at a vehicle start and to improve fuel consumption.

What is claimed is:

1. A control apparatus of an automatic transmission having an automatic speed change mechanism that is capable of changing speed of rotation of a driving source and includes a clutch engaged at a start, a torque converter interposed between the driving source and the automatic speed change mechanism, and a lock-up clutch capable of locking up the torque converter, the control apparatus comprising:
a controller for controlling:
a range determination unit that determines a shift range, the shift range including a drive range,
a vehicle stop determination unit that determines whether a vehicle is stopped,
a start intended operation detecting unit that detects an operation intended for starting the vehicle,
a clutch control unit that controls the clutch to be disengaged to place the automatic speed change mechanism in a neutral state while the shift range is determined as the drive range and the vehicle is determined to be stopped, and performs engagement control of the clutch to control the start of the vehicle when the operation intended for starting the vehicle is detected, and
a lock-up clutch control unit that controls the lock-up clutch to be engaged while the shift range is determined to be the drive range and the vehicle is determined to be stopped, and controls the lock-up clutch so that the lock-up clutch is at least engaged with a predetermined torque capacity being obtained, when the operation intended for starting the vehicle is detected, wherein
the vehicle is started while slip-controlling the clutch with the lock-up clutch engaged without being slipped, when an output torque of the driving source and a torque capacity of the clutch are smaller than the predetermined torque capacity of the lock-up clutch, and
the vehicle is started by using a torque amplifying function of the torque converter while slipping the lock-up clutch, when the output torque of the driving source and the torque capacity of the clutch are larger than the predetermined torque capacity of the lock-up clutch.

2. The control apparatus of an automatic transmission according to claim 1, wherein
the vehicle is started by using a torque amplifying function of the torque converter while releasing the lock-up clutch by the lock-up clutch control unit, when the output torque of the driving source and the torque capacity of the clutch are larger than the predetermined torque capacity of the lock-up clutch.

3. The control apparatus of an automatic transmission according to claim 2, further comprising:
a required output detecting unit that detects a required output of a driver,
a vehicle speed detecting unit that detects a vehicle speed of the vehicle, and
a lock-up control map that is provided with a release region, a slip region, and an engagement region of the lock-up clutch corresponding to a relation between the required output and the vehicle speed, wherein
the lock-up clutch control unit controls release, slip, and engagement of the lock-up clutch by referring to the lock-up control map based on the required output and the vehicle speed, and the release region of the lock-up clutch corresponds to the state in which the output torque of the driving source and the torque capacity of the clutch are larger than the predetermined torque capacity of the lock-up clutch.

* * * * *